US012617283B2

(12) United States Patent
Goto

(10) Patent No.: US 12,617,283 B2
(45) Date of Patent: May 5, 2026

(54) DRIVING ASSISTANCE APPARATUS, DRIVING ASSISTANCE METHOD, AND NON-TRANSITORY RECORDING MEDIUM

(71) Applicant: SUBARU CORPORATION, Tokyo (JP)

(72) Inventor: Ikuo Goto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 52 days.

(21) Appl. No.: 18/746,434

(22) Filed: Jun. 18, 2024

(65) Prior Publication Data

US 2024/0336140 A1     Oct. 10, 2024

Related U.S. Application Data

(63) Continuation of application No. PCT/JP2023/001386, filed on Jan. 18, 2023.

(51) Int. Cl.
 B60K 35/28 (2024.01)
 B60W 50/14 (2020.01)
 G06V 20/58 (2022.01)

(52) U.S. Cl.
 CPC ............. B60K 35/28 (2024.01); B60W 50/14 (2013.01); G06V 20/58 (2022.01);
 (Continued)

(58) Field of Classification Search
 CPC ............. B60K 35/28; B60K 2360/176; B60K 2360/1868; B60W 50/14;
 (Continued)

(56) References Cited

U.S. PATENT DOCUMENTS

| 8,548,643 | B2 | 10/2013 | Asano | |
| 2018/0336787 | A1* | 11/2018 | Ohnishi | ................. G08G 1/167 |
| 2020/0406747 | A1* | 12/2020 | Sakai | ........................ B60R 1/24 |

FOREIGN PATENT DOCUMENTS

| JP | 2002-340583 A | 11/2002 |
| JP | 2010-224762 A | 10/2010 |
| JP | 2018-195289 A | 12/2018 |

OTHER PUBLICATIONS

International Search Report issued in corresponding International Patent Application No. PCT/JP2023/001386, dated Apr. 4, 2023.

* cited by examiner

*Primary Examiner* — Abby Lin
*Assistant Examiner* — Renee LaRose
(74) *Attorney, Agent, or Firm* — Rimon P.C.

(57) ABSTRACT

A driving assistance apparatus configured to assist driving of a vehicle by a driver who drives the vehicle: acquires, from at least one environment recognition device provided at a location other than the vehicle, measurement range data of the environment recognition device and measurement result data obtained by the environment recognition device; causes the measurement range data and the measurement result data visually recognizable by the vehicle's driver to be displayed on an image display in a superimposed manner on map data, a real space, or a captured image of the real space; and causes a display of a non-measurement range to be shifted to the display of the non-measurement range as time elapses when the measurement range of the environment recognition device in the real space changes. The display of the non-measurement range is a display of a range deviating from the measurement range and not being measured.

12 Claims, 18 Drawing Sheets

(52) U.S. Cl.
CPC .................. *B60K 2360/176* (2024.01); *B60K 2360/1868* (2024.01); *B60W 2050/146* (2013.01); *B60W 2420/403* (2013.01); *G06V 2201/08* (2022.01)

(58) Field of Classification Search
CPC ...... B60W 2050/146; B60W 2420/403; G06V 20/58; G06V 2201/08; G08G 1/09; G08G 1/0969

See application file for complete search history.

TIME = t3

TIME = t1

TIME = t4

TIME = t1

DRIVING ASSISTANCE APPARATUS, DRIVING ASSISTANCE METHOD, AND NON-TRANSITORY RECORDING MEDIUM

CROSS-REFERENCE TO RELATED APPLICATIONS

This application is continuation of International Application No. PCT/JP2023/001386, filed on Jan. 18, 2023, the entire contents of which are hereby incorporated by reference.

BACKGROUND

The disclosure relates to a driving assistance apparatus, a driving assistance method, and a non-transitory recording medium.

As a technique that prevents an unexpected event at an intersection, a technique is known in which a vehicle to be assisted acquires data on another vehicle detected by, for example, a sensor or a camera provided at a location other than the vehicle to be assisted using a vehicle-to-vehicle communication system or a road-to-vehicle communication system, and gives, for example, a warning to a driver who drives the vehicle to be assisted.

For example, Japanese Unexamined Patent Application Publication (JP-A) No. 2002-340583 proposes a surrounding vehicle data providing apparatus that uses vehicle-to-vehicle communication to appropriately display, to a driver who drives a vehicle, a traffic condition of surroundings including surrounding vehicles. For example, JP-A No. 2002-340583 discloses a technique that: acquires, from a radar device, data indicating a condition around an own vehicle such as presence or absence of an obstacle in front of the own vehicle; acquires, from vehicle-mounted sensors, data indicating a traveling state such as a traveling speed of the own vehicle; grasps, by a navigation device, a position of the own vehicle and a road on which the own vehicle travels; extracts data on an intersection that the own vehicle is to pay attention to from a traveling viewpoint; acquires, from another vehicle around the own vehicle using a wireless communication device, data indicating a traveling state of the other vehicle such as a relative position and an azimuth with respect to the own vehicle; determines, for example, a position and a vehicle type regarding the other vehicle traveling toward the identified intersection, based on the data indicating the traveling state of the other vehicle; determines a possibility that the traveling of the own vehicle affects the other vehicle; and extracts the other vehicle that is likely to be affected to provide data to be displayed on a display as a character.

Further, JP-A No. 2010-224762 discloses a data providing apparatus that provides an occupant of a vehicle having a vehicle-to-vehicle communication capability with data on a mobile object that has no vehicle-to-vehicle communication capability and has a possibility of approaching the vehicle on a course of the vehicle. For example, the data providing apparatus has been proposed that transmits: data on an own vehicle; data on the mobile object including a position, a traveling speed, and a traveling direction of the mobile object; and a time at which these pieces of data are obtained, to a base station. The data providing apparatus receives prediction data, calculated at the base station, on the mobile object that exists within a predetermined range including the position of the own vehicle. The data providing apparatus provides the data to the occupant of the own vehicle.

SUMMARY

An aspect of the disclosure provides a driving assistance apparatus configured to assist driving of a vehicle by a driver who drives the vehicle. The driving assistance apparatus includes one or more processors and one or more memories communicably coupled to the one or more processors. The one or more processors are configured to: acquire, from at least one environment recognition device provided at a location other than the vehicle, data on a measurement range of the environment recognition device and data on a measurement result obtained by the environment recognition device; cause the data on the measurement range and the data on the measurement result that are visually recognizable by the driver of the vehicle to be displayed on an image display in a superimposed manner on map data, a real space, or a captured image of the real space; and cause a display of a non-measurement range to be shifted to the display of the non-measurement range as time elapses when the measurement range of the environment recognition device in the real space changes, the display of the non-measurement range being a display of a range that deviates from the measurement range and is not being measured.

An aspect of the disclosure provides a driving assistance method that assists driving of a vehicle by a driver who drives the vehicle. The method includes: acquiring, from at least one environment recognition device provided at a location other than the vehicle, data on a measurement range of the environment recognition device and data on a measurement result obtained by the environment recognition device; causing the data on the measurement range and the data on the measurement result that are visually recognizable by the driver of the vehicle to be displayed on an image display in a superimposed manner on map data, a real space, or a captured image of the real space; and causing a display of a non-measurement range to be shifted to the display of the non-measurement range as time elapses when the measurement range of the environment recognition device in the real space changes, the display of the non-measurement range being a display of a range that deviates from the measurement range and is not being measured.

An aspect of the disclosure provides a non-transitory tangible computer readable recording medium containing a program. The program causes, when executed by a computer, the computer to implement a method. The method includes: acquiring, from at least one environment recognition device provided at a location other than a vehicle, data on a measurement range of the environment recognition device and data on a measurement result obtained by the environment recognition device; causing the data on the measurement range and the data on the measurement result that are visually recognizable by a driver who drives the vehicle to be displayed on an image display in a superimposed manner on map data, a real space, or a captured image of the real space; and causing a display of a non-measurement range to be shifted to the display of the non-measurement range as time elapses when the measurement range of the environment recognition device in the real space changes, the display of the non-measurement range being a display of a range that deviates from the measurement range and is not being measured.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

Figures 1, 2:
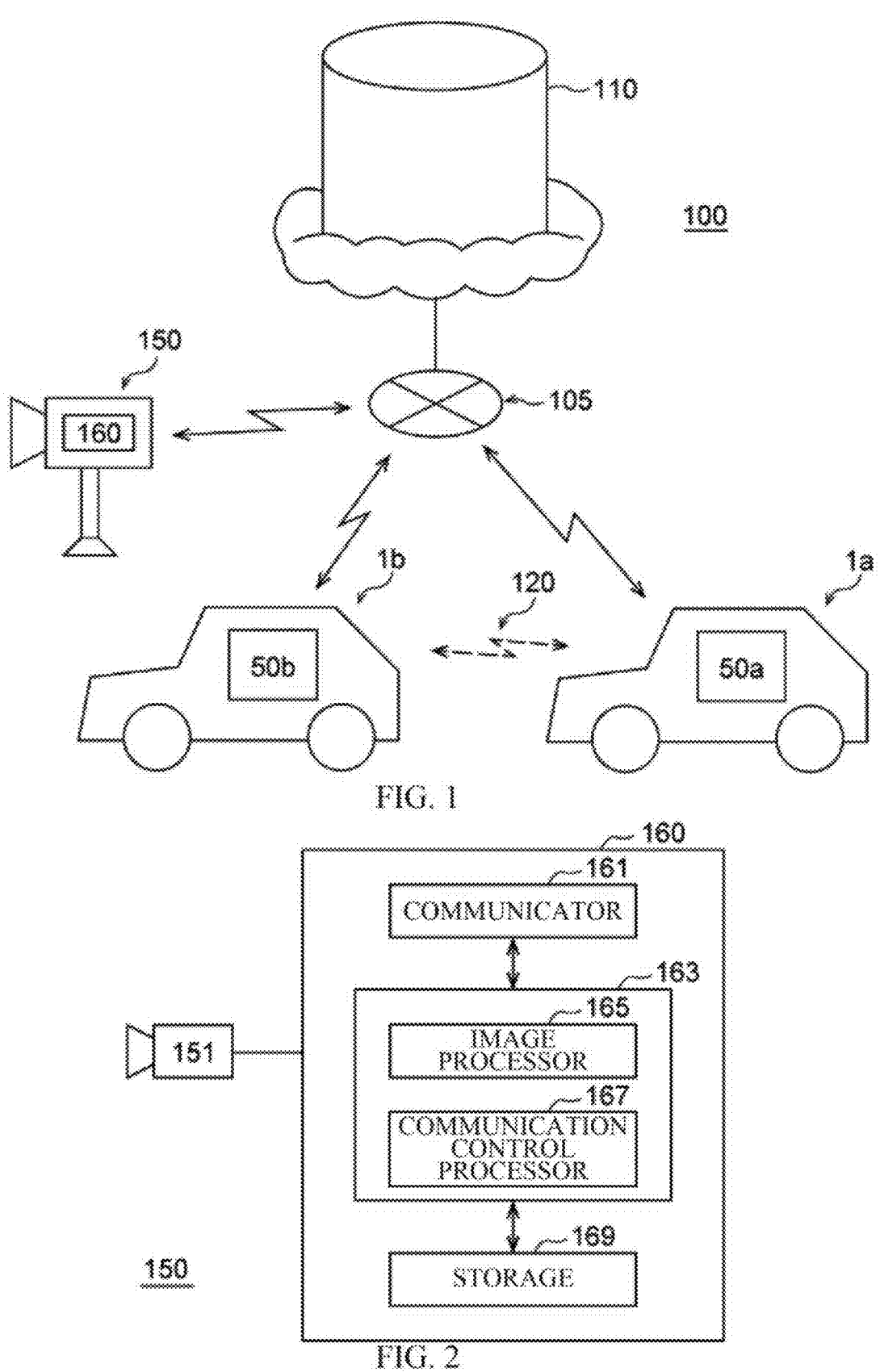

FIG. 1 is a schematic diagram illustrating a basic configuration of a driving assistance system including a driving assistance apparatus according to one example embodiment of the disclosure.

FIG. 2 is a block diagram illustrating a configuration example of an environment recognition device (an on-road camera) of the driving assistance system illustrated in FIG. 1.

Figure 3:
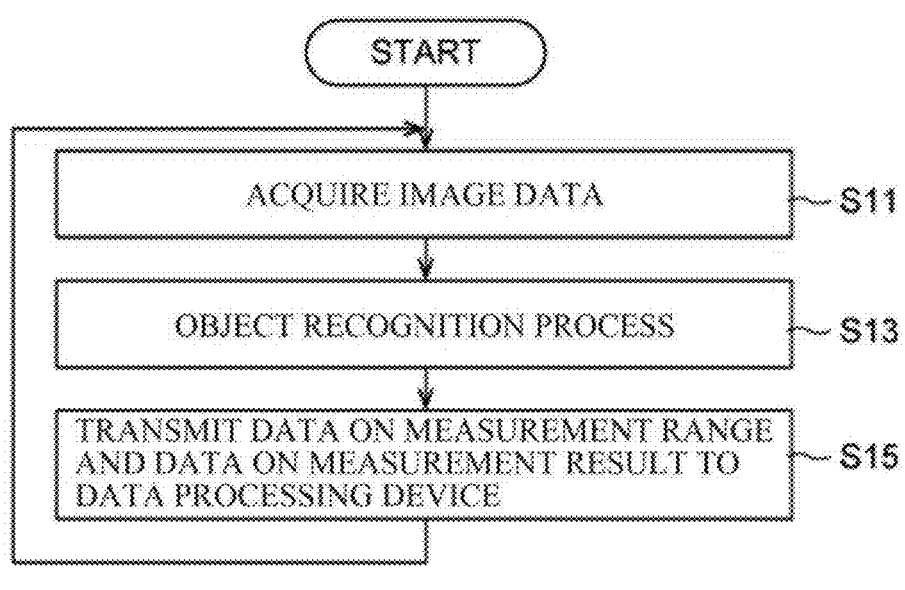

FIG. 3 is a flowchart illustrating a processing operation performed by the environment recognition device (the on-road camera) of the driving assistance system illustrated in FIG. 1.

Figure 4:
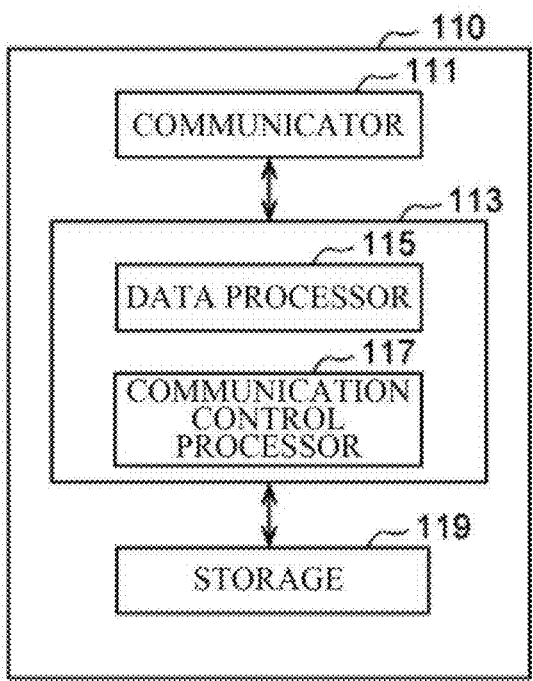

FIG. 4 is a block diagram illustrating a configuration example of a data processing device of the driving assistance system illustrated in FIG. 1.

Figure 5:
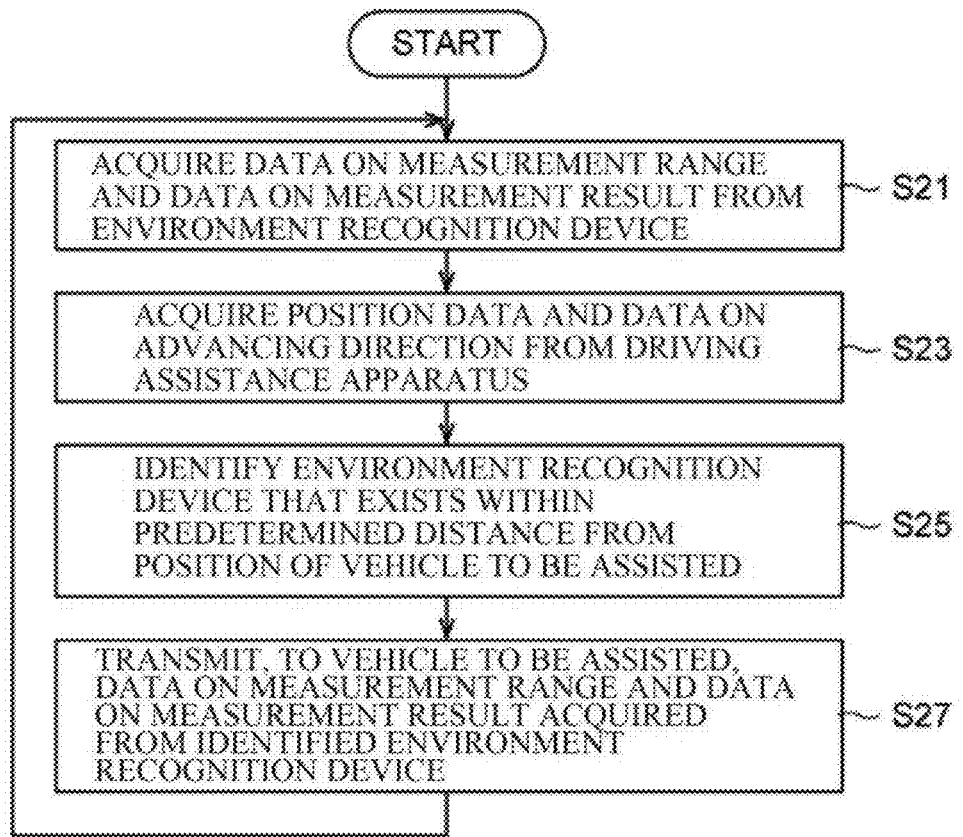

FIG. 5 is a flowchart illustrating a processing operation performed by the data processing device of the driving assistance system illustrated in FIG. 1.

Figure 6:
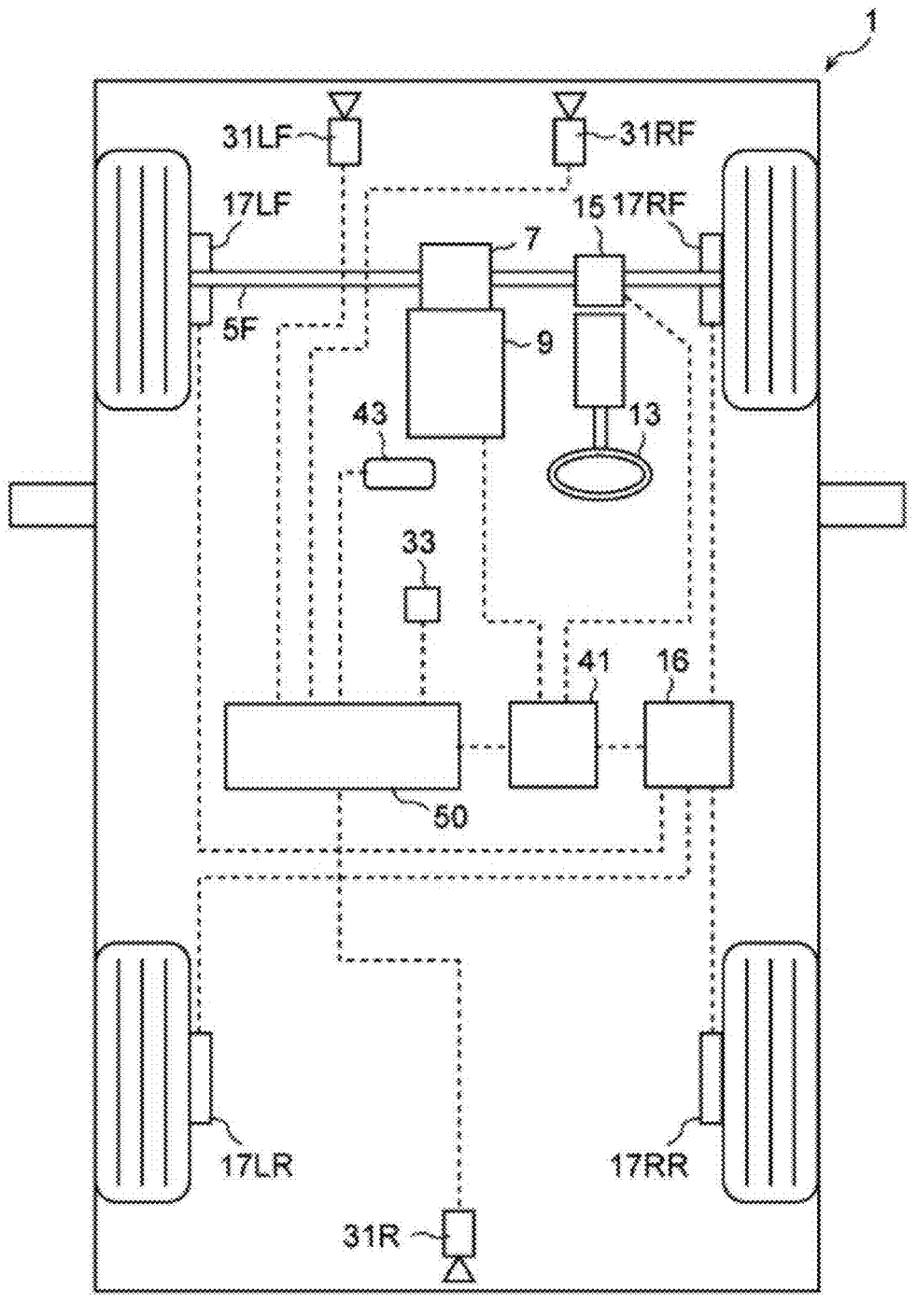

FIG. 6 is a schematic diagram illustrating a configuration example of a vehicle including the driving assistance apparatus illustrated in FIG. 1.

Figure 7:
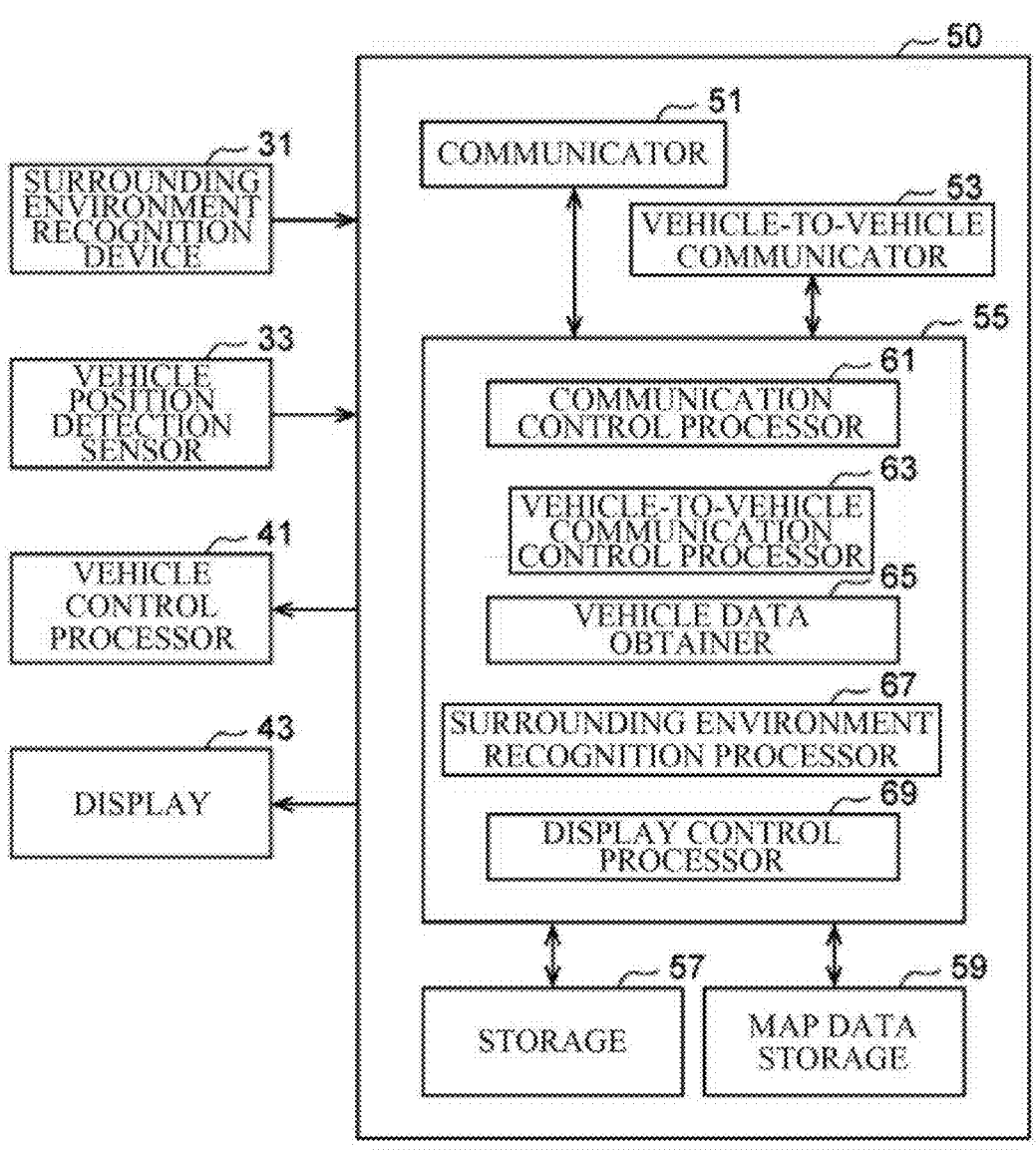

FIG. 7 is a block diagram illustrating a configuration example of the driving assistance apparatus illustrated in FIG. 1.

Figure 8:
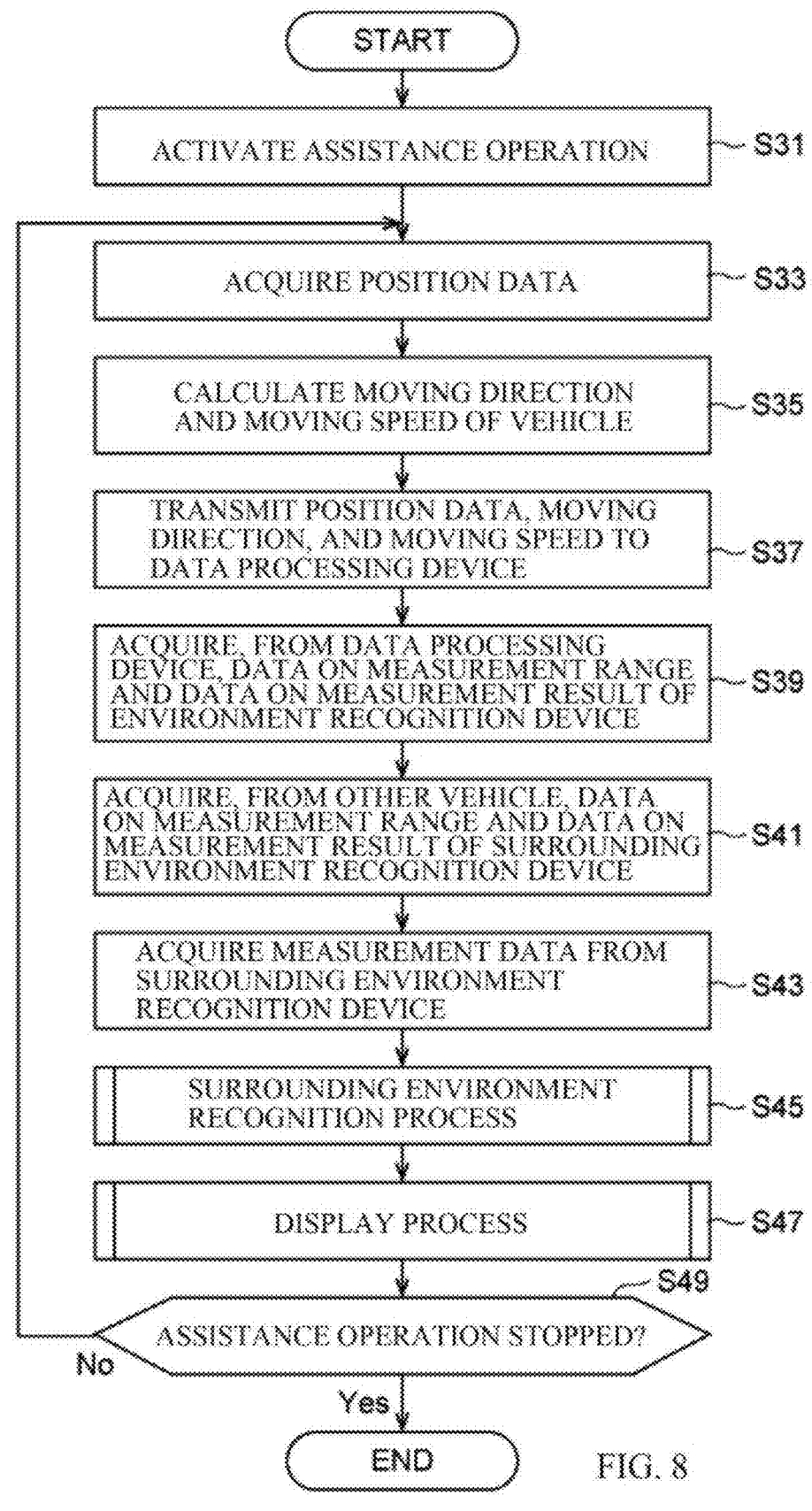

FIG. 8 is a flowchart illustrating a main routine of a processing operation performed by the driving assistance apparatus illustrated in FIG. 1.

Figure 9:
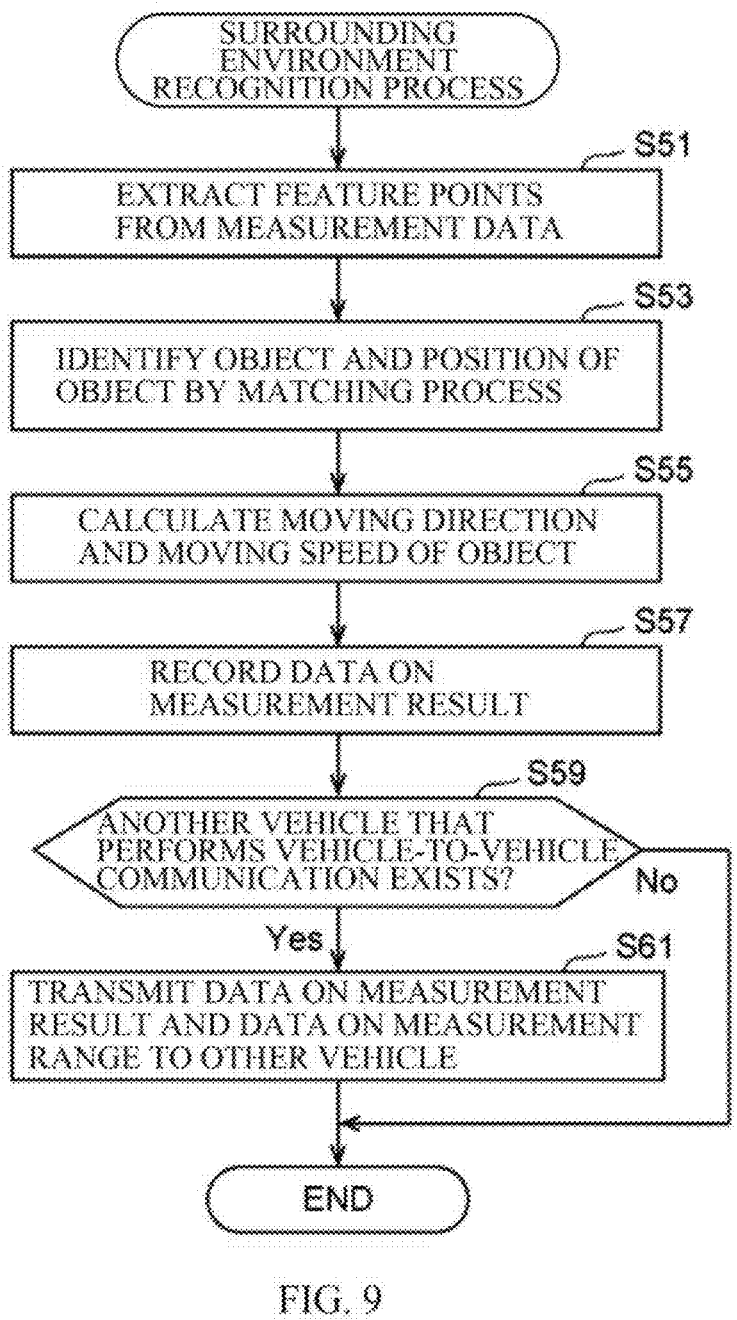

FIG. 9 is a flowchart illustrating a surrounding environment recognition process performed by the driving assistance apparatus illustrated in FIG. 1.

Figure 10:
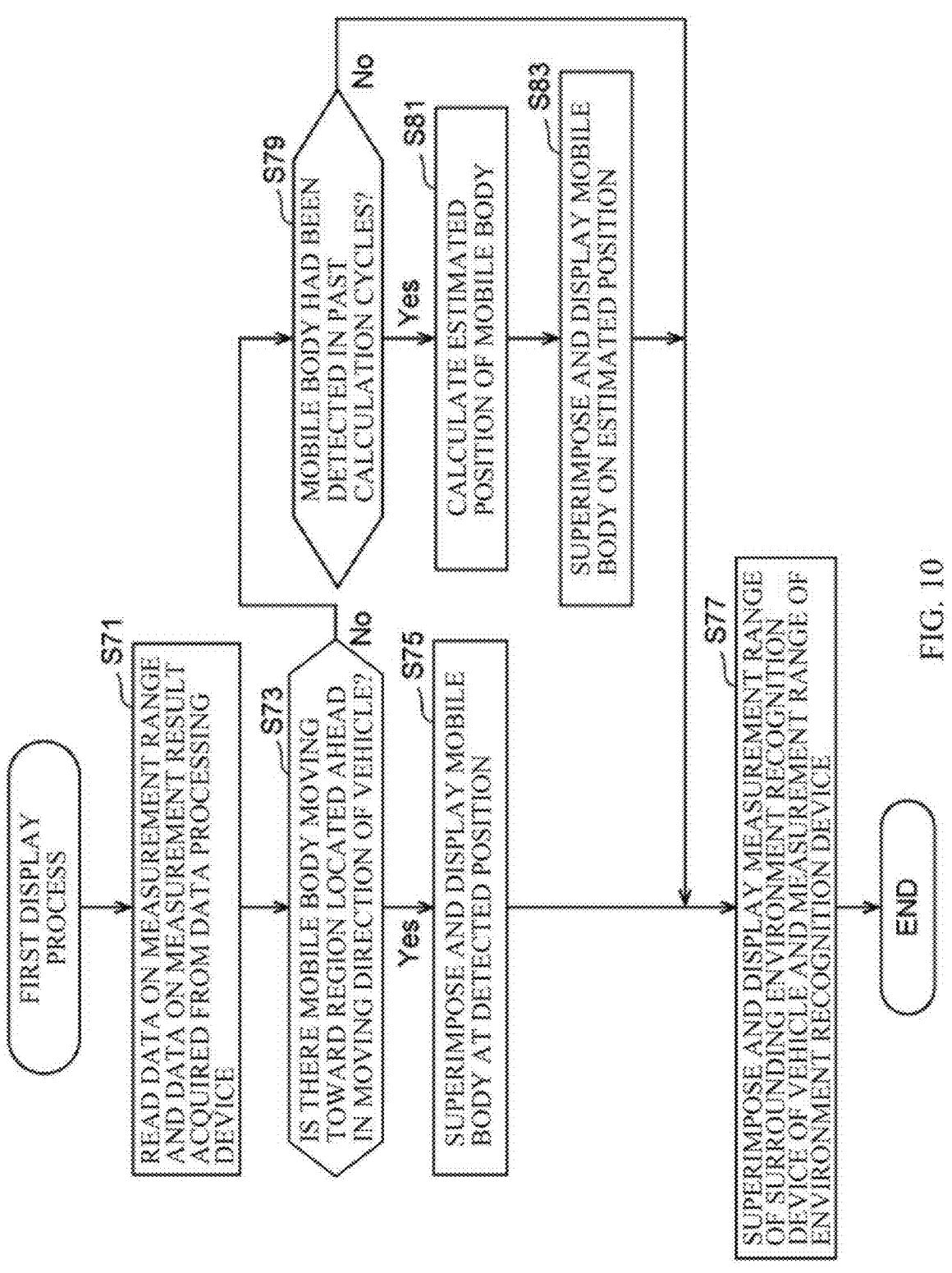

FIG. 10 is a flowchart illustrating a first display process performed by the driving assistance apparatus illustrated in FIG. 1.

Figures 11, 12:
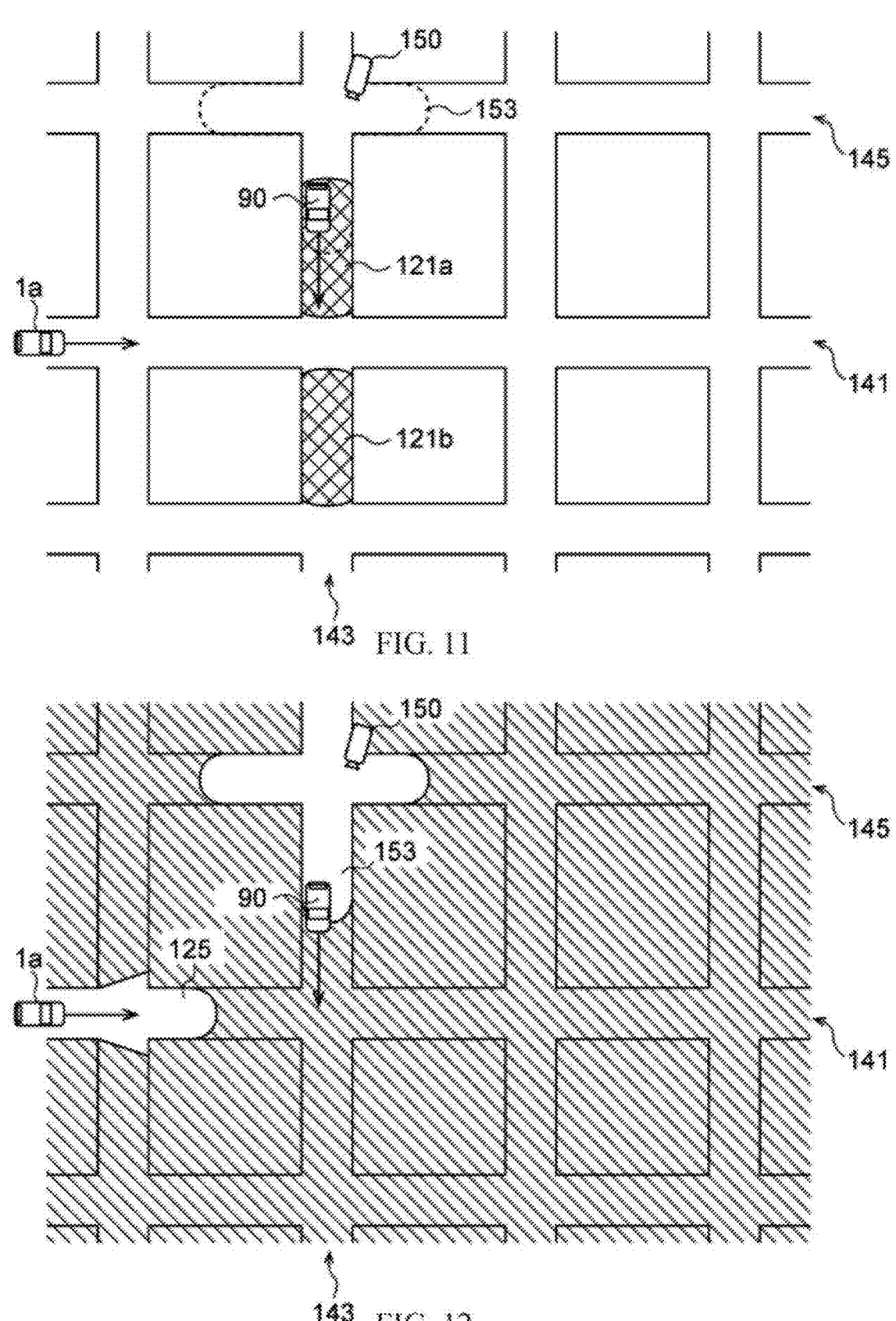

FIG. 11 is an explanatory diagram illustrating workings of the first display process.

FIG. 12 is an explanatory diagram illustrating what is displayed by the first display process.

Figure 13:
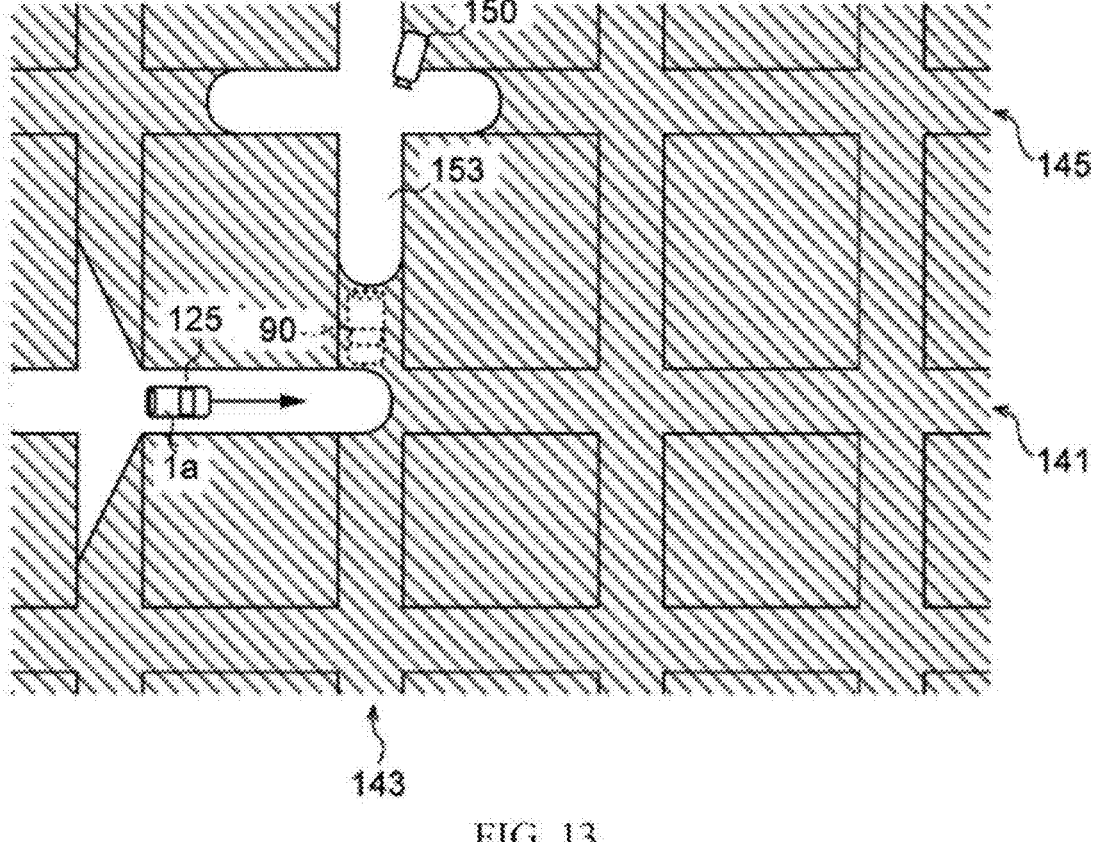

FIG. 13 is an explanatory diagram illustrating what is displayed by the first display process.

Figure 14:
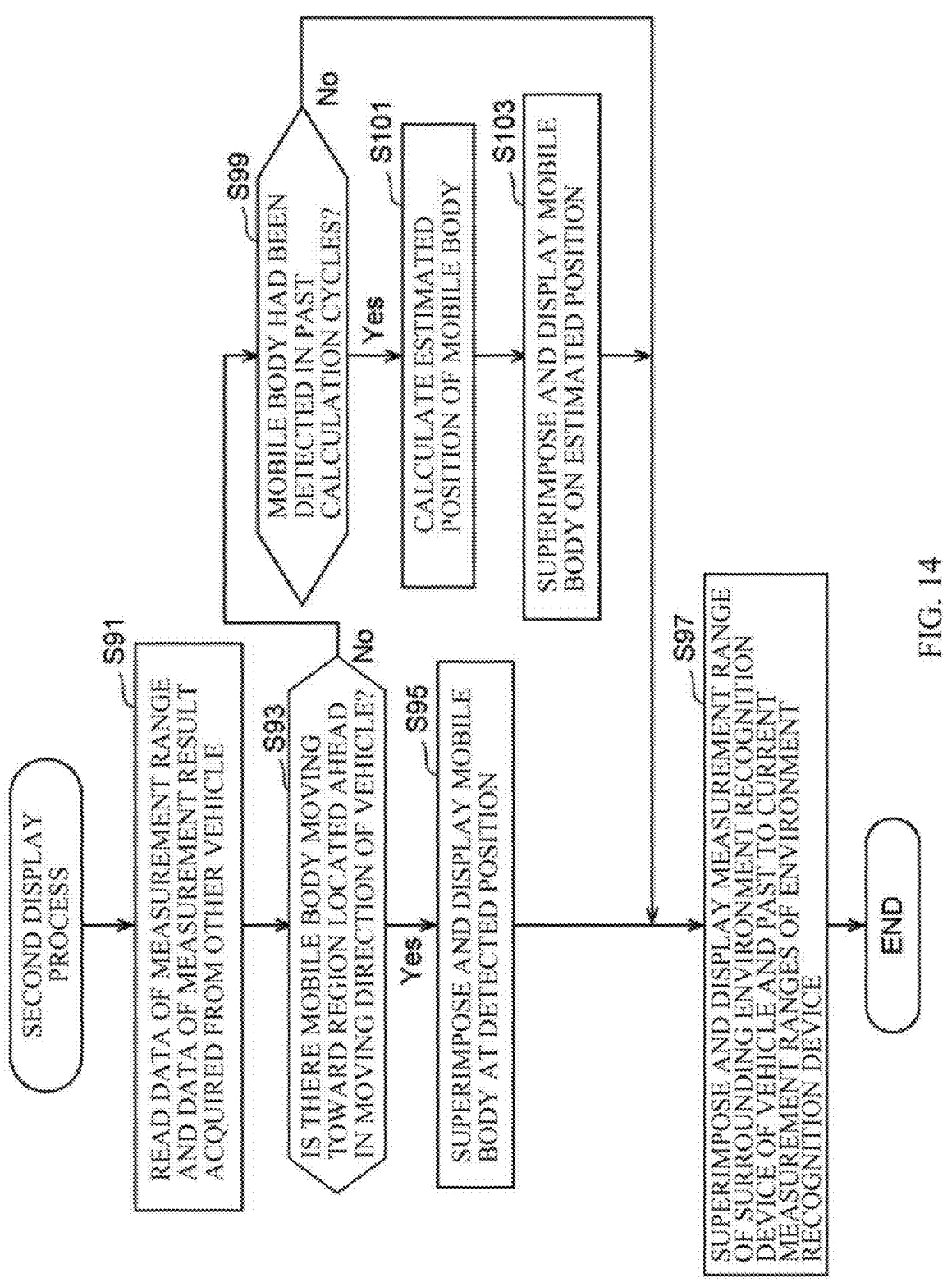

FIG. 14 is a flowchart illustrating a second display process performed by the driving assistance apparatus illustrated in FIG. 1.

Figures 15, 16:
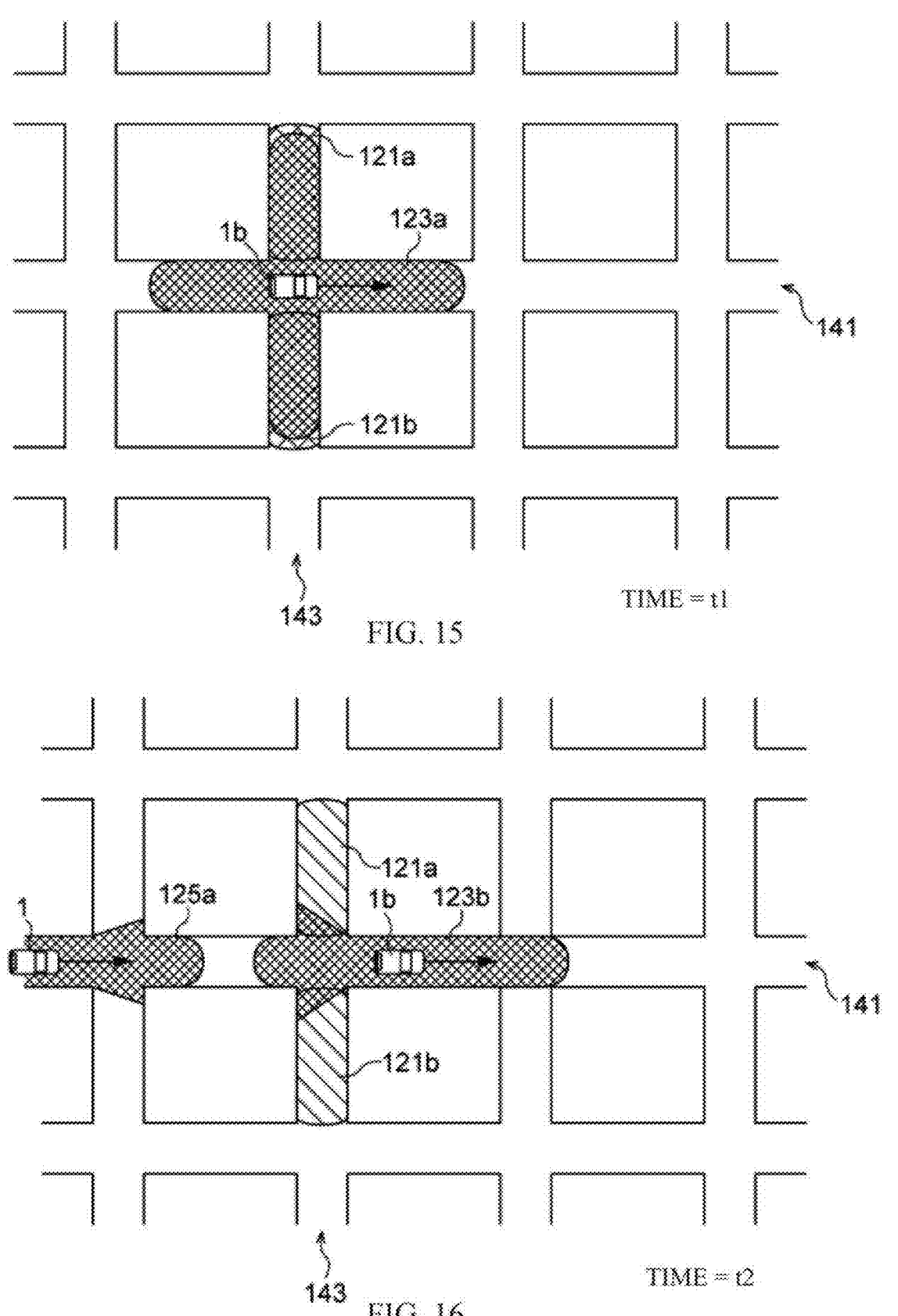

FIG. 15 is an explanatory diagram illustrating a reference example display that does not display a measurement range.

FIG. 16 is an explanatory diagram illustrating a reference example display that does not display the measurement range.

Figure 17:
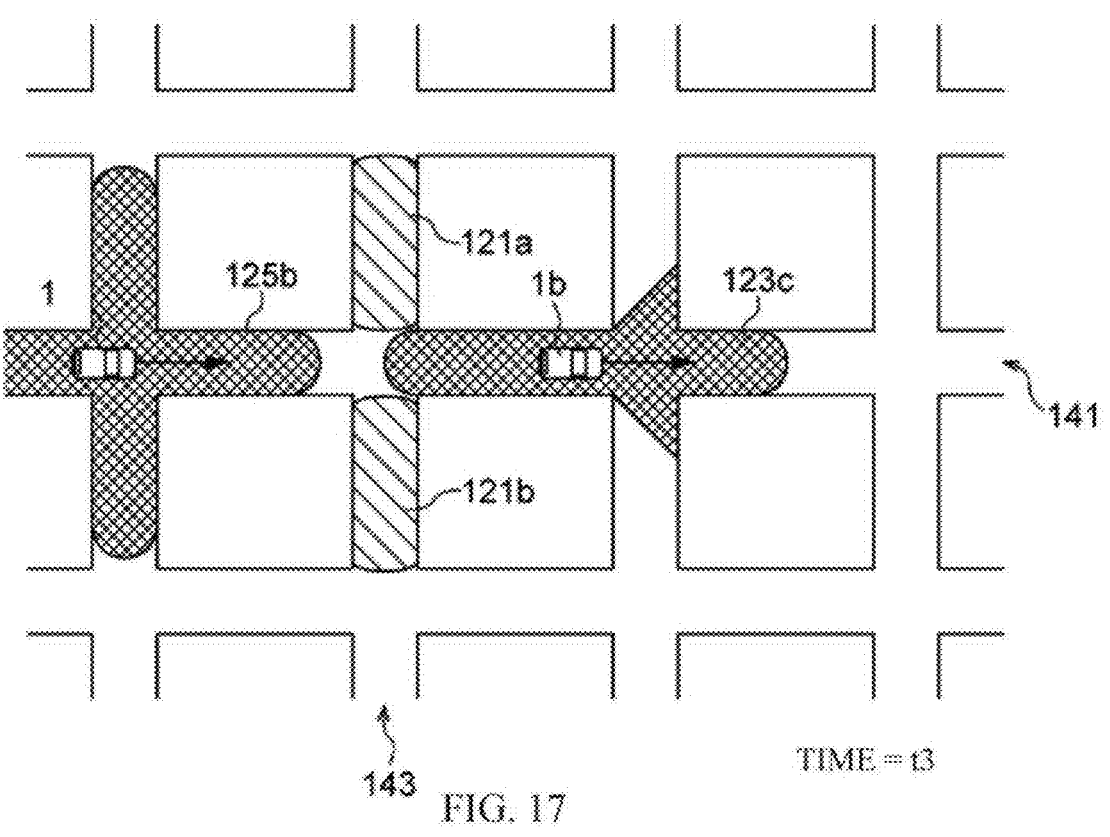

FIG. 17 is an explanatory diagram illustrating a reference example display that does not display the measurement range.

Figure 18:
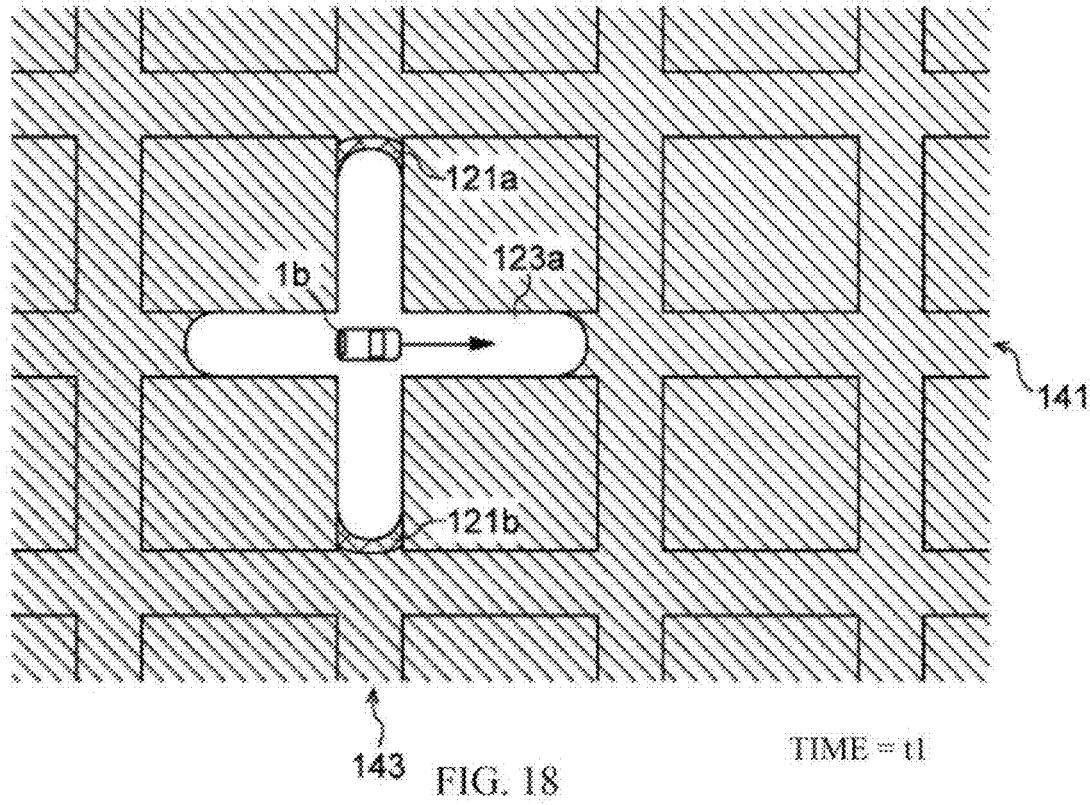

FIG. 18 is an explanatory diagram illustrating what is displayed by the second display process.

Figure 19:
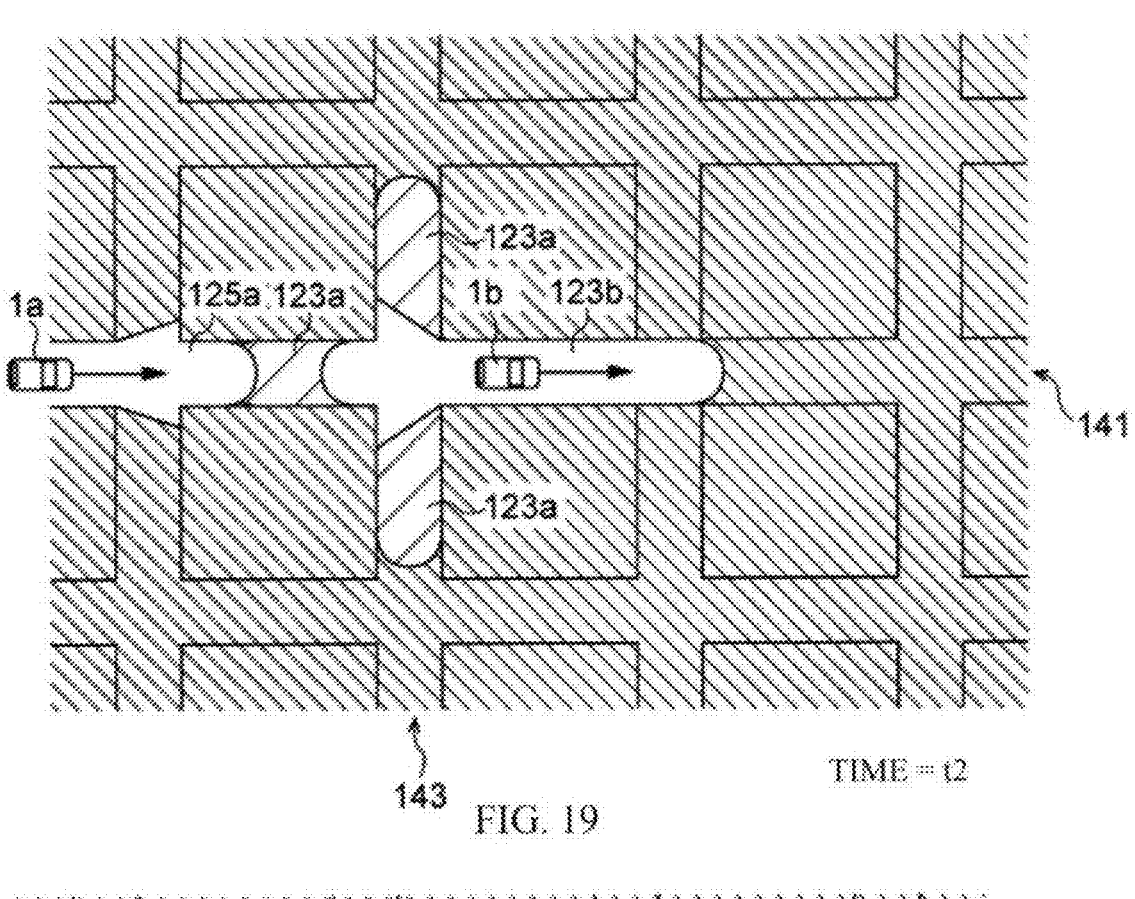

FIG. 19 is an explanatory diagram illustrating what is displayed by the second display process.

Figure 20:
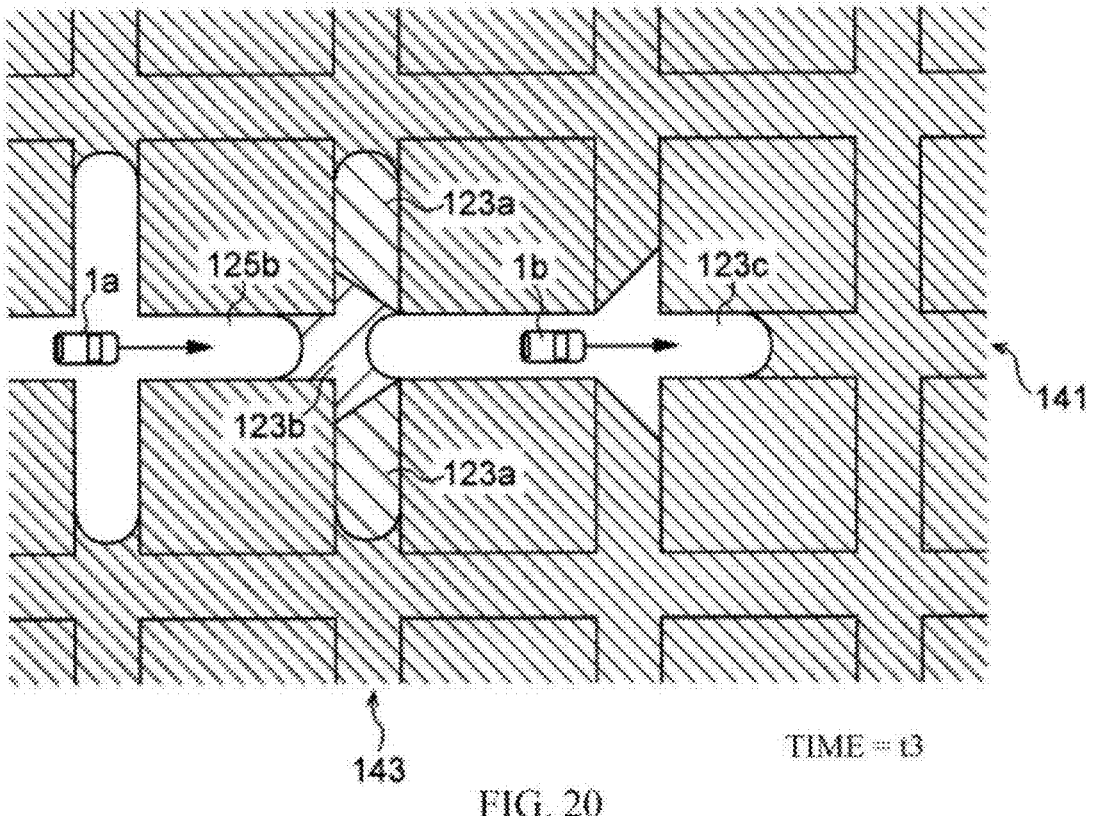

FIG. 20 is an explanatory diagram illustrating what is displayed by the second display process.

Figure 21:
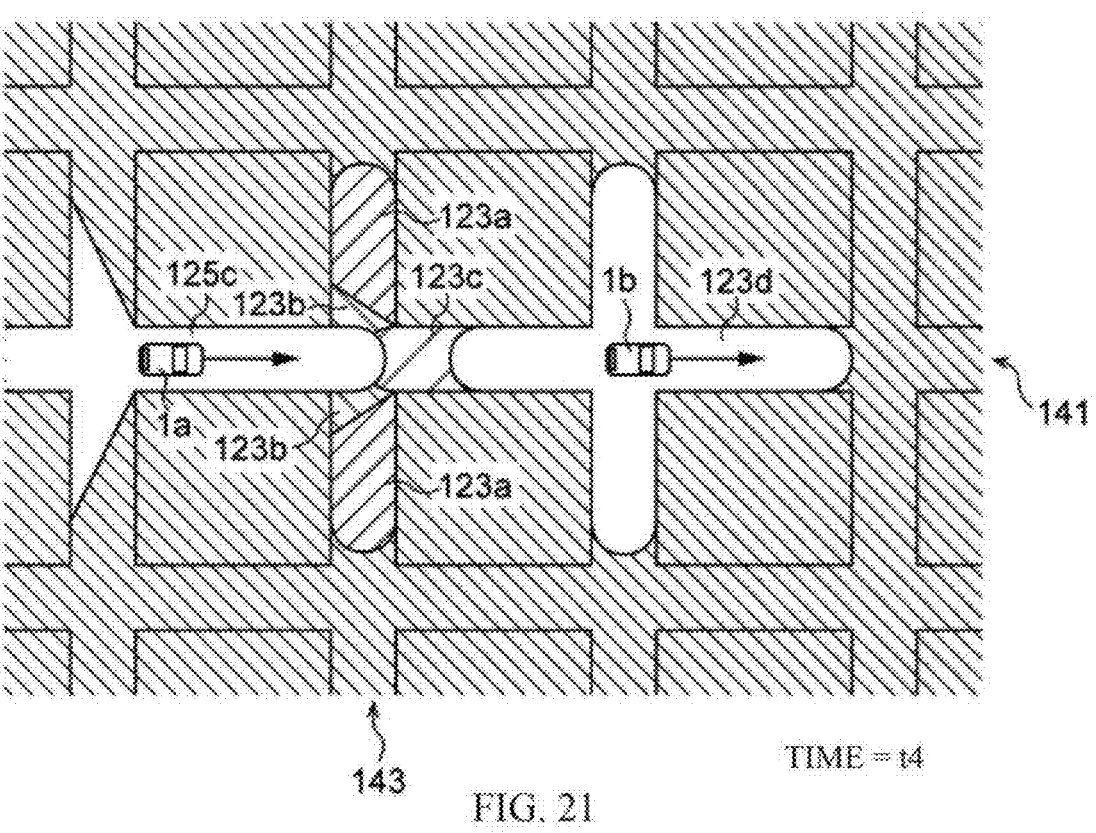

FIG. 21 is an explanatory diagram illustrating what is displayed by the second display process.

Figure 22:
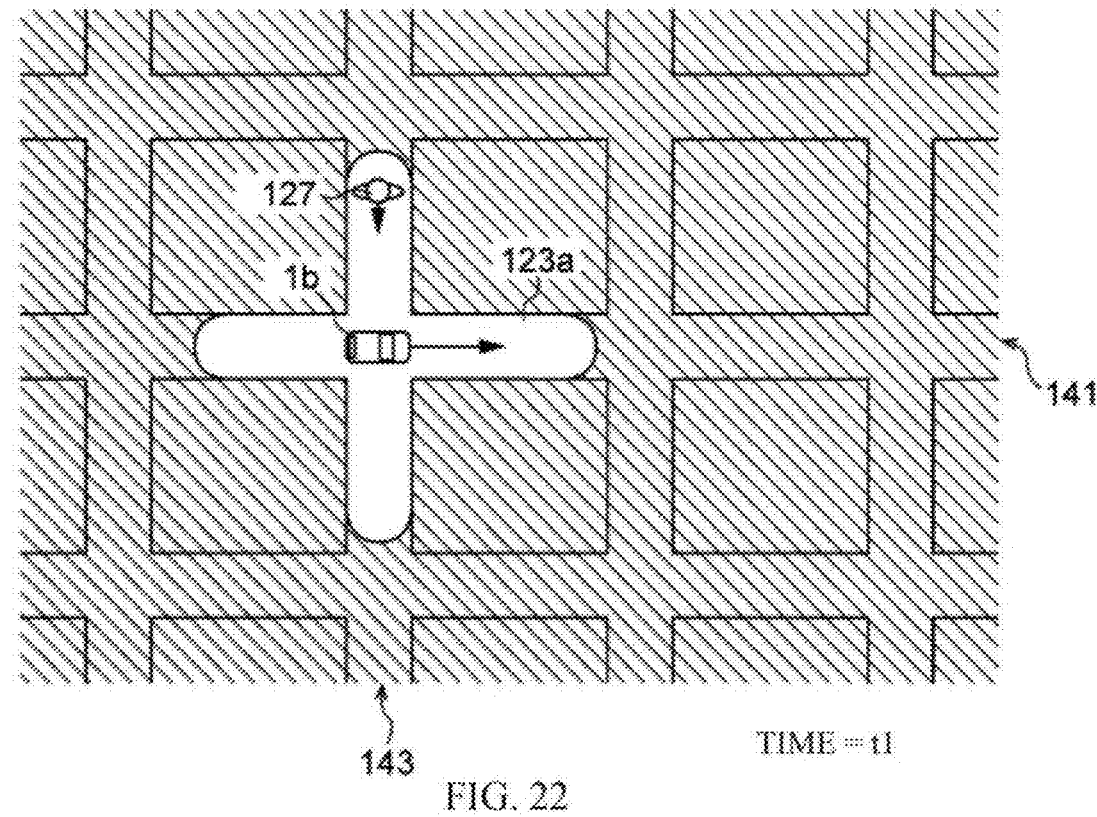

FIG. 22 is an explanatory diagram illustrating what is displayed by the second display process.

Figures 23, 24:
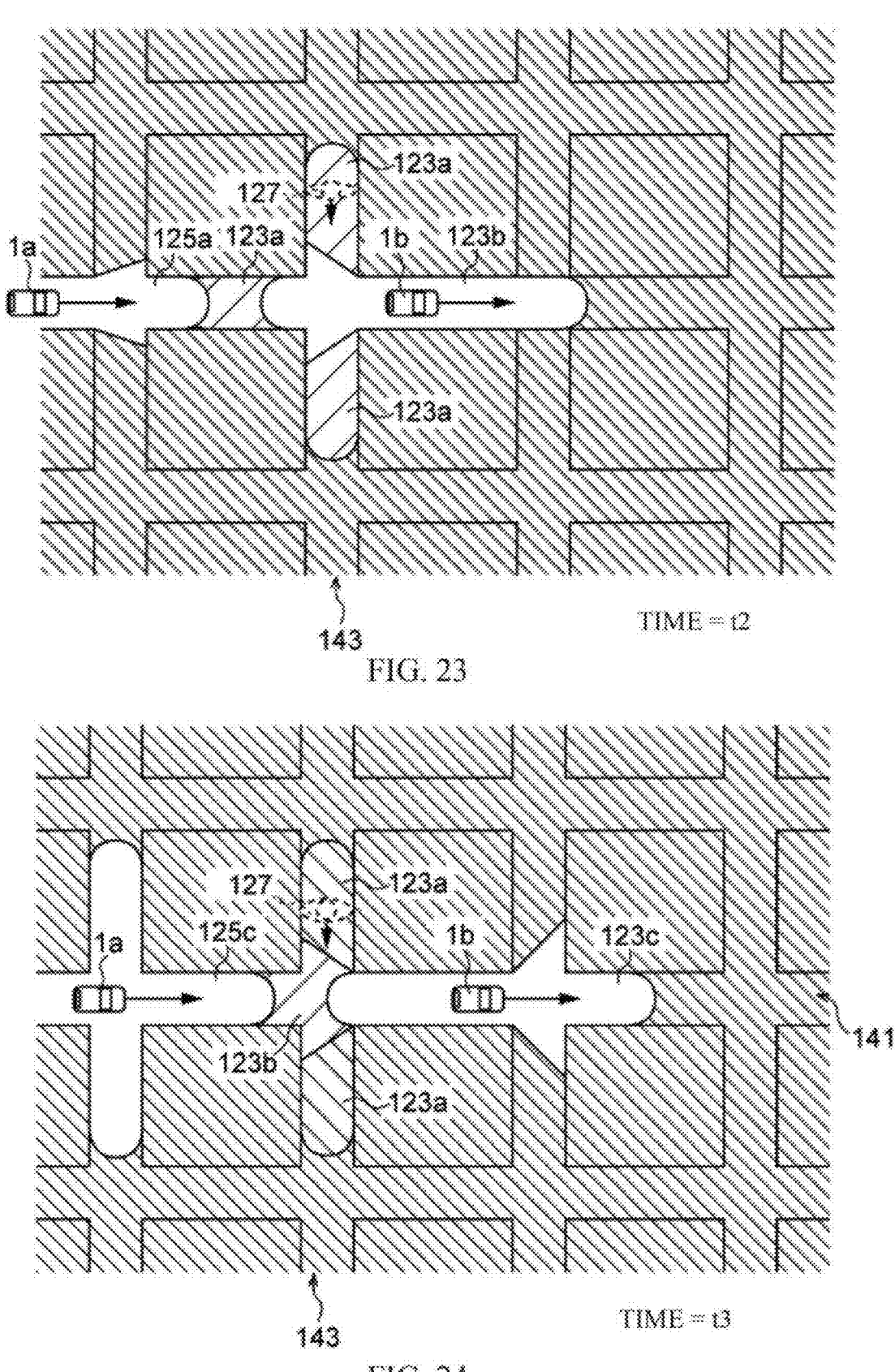

FIG. 23 is an explanatory diagram illustrating what is displayed by the second display process.

FIG. 24 is an explanatory diagram illustrating what is displayed by the second display process.

4

Figure 25:
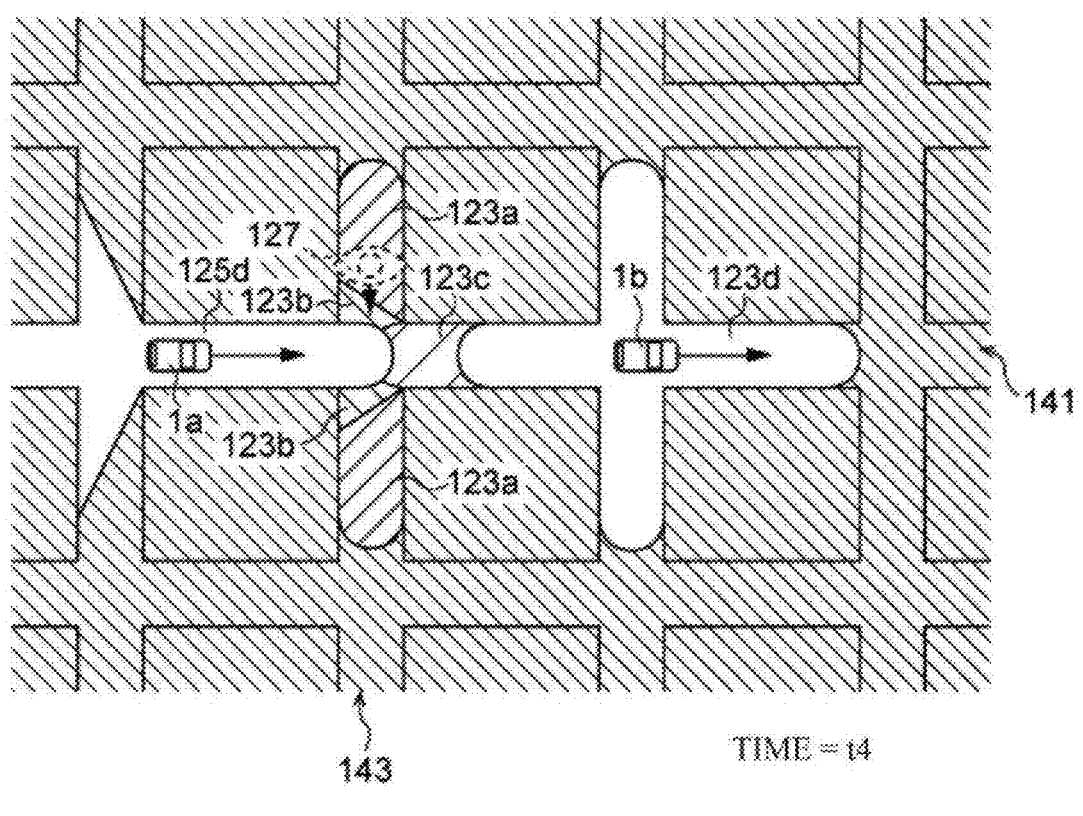

FIG. 25 is an explanatory diagram illustrating what is displayed by the second display process.

Figure 26:
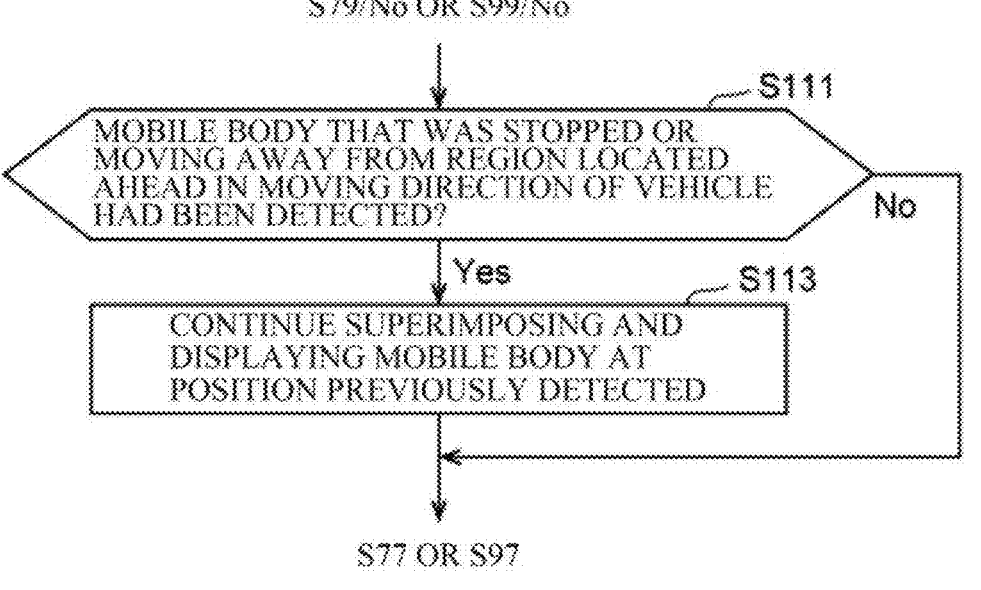

FIG. 26 is a flowchart illustrating a display process according to one modification example of the example embodiment.

Figure 27:
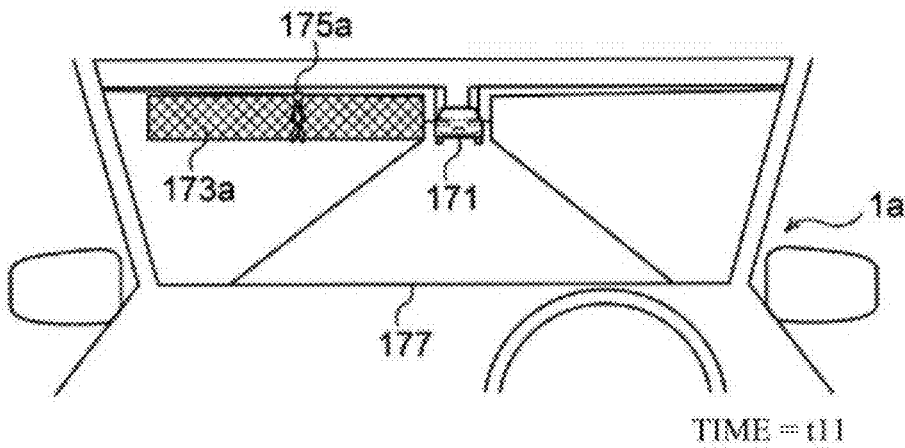

FIG. 27 is an explanatory diagram illustrating what is displayed according to one modification example of the example embodiment.

Figure 28:
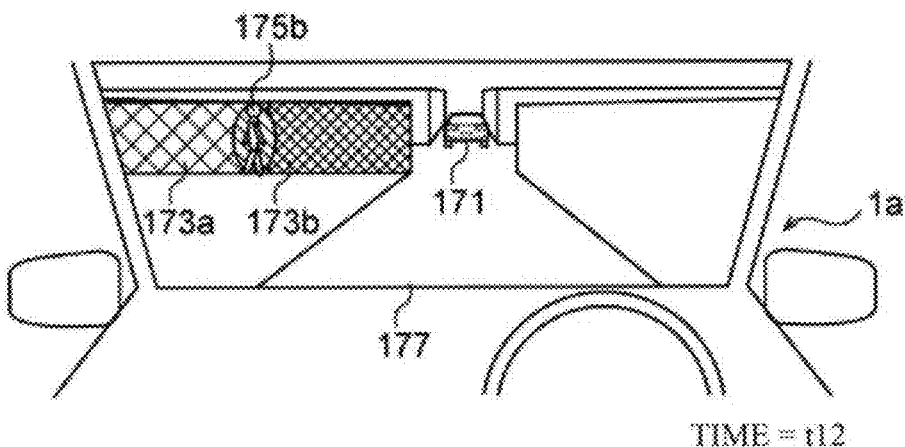

FIG. 28 is an explanatory diagram illustrating what is displayed according to one modification example of the example embodiment.

Figure 29:
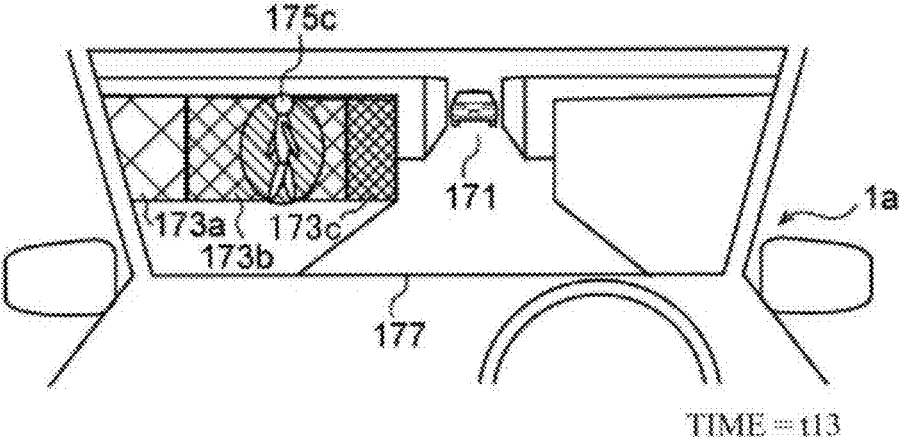

FIG. 29 is an explanatory diagram illustrating what is displayed according to one modification example of the example embodiment.

DETAILED DESCRIPTION

In techniques described in JP-A Nos. 2002-340583 and 2010-224762, there is a possibility that a gap is caused between a region recognizable by a system of each of vehicles and a region recognizable by a driver who drives a vehicle, causing the driver to be unable to recognize that a display provided by a device is correct and not to perform an avoidance behavior expected by driving assistance. For example, when a vehicle is traveling toward an intersection with poor visibility, the system of the vehicle is sometimes able to recognize a left blind spot out of left and right blind spots of the intersection as viewed from the vehicle, while not being able to recognize the right blind spot. In this case, because there is no way for the driver to grasp the region recognizable by the system of the vehicle in the techniques described in JP-A Nos. 2002-340583 and 2010-224762, when the driving assistance for the left blind spot is performed while the driving assistance for the right blind spot is not performed, the driver may possibly determine that there is no risk of a pedestrian rushing out from the right blind spot and refrain from taking the avoidance behavior. The same applies to a case of using a measurement result obtained by, for example, a camera installed on a road. There is a possibility that a gap is caused between a region that is recognizable by, for example, the camera and a region that is recognizable by the driver, causing the driver not to perform the avoidance behavior expected by the driving assistance.

It is desirable to provide a driving assistance apparatus, a driving assistance method, and a non-transitory recording medium containing a program that make it possible to cause a driver who drives a vehicle to be assisted to perform an appropriate driving behavior by displaying data on a surrounding environment acquired by the vehicle to be assisted from an environment recognition device outside the vehicle, together with a measurement range of the environment recognition device.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Basic Configuration of Driving Assistance System

First, a basic configuration of a driving assistance system 100 according to an example embodiment of the disclosure will be described.

FIG. 1 is an explanatory diagram illustrating an example of the basic configuration of the driving assistance system 100.

The driving assistance system 100 may include a first vehicle 1a and a second vehicle 1b, an on-road camera 150 installed, for example, on a road, and a data processing device 110. To facilitate understanding of the technique of the disclosure, the driving assistance system 100 illustrated in FIG. 1 may include the first vehicle 1a, the second vehicle 1b, the on-road camera 150, and the data processing device 110. However, the driving assistance system 100 may include multiple vehicles, multiple on-road cameras 150, and multiple data processing devices 110. Hereinafter, the first vehicle 1a and the second vehicle 1b will be collectively referred to as a vehicle 1, and driving assistance apparatuses 50a and 50b will be referred to as a driving assistance apparatus 50, unless it is necessary to specifically distinguish them from one another. In one embodiment, the driving assistance apparatuses 50, 50a, and 50b may serve as a "driving assistance apparatus". In one embodiment, the vehicles 1, 1a, and 1b may serve as a "vehicle".

The first vehicle 1a may include the driving assistance apparatus 50a, and the second vehicle 1b may include the driving assistance apparatus 50b. Each of the driving assistance apparatuses 50a and 50b may include one or more processors. The on-road camera 150 may include a control device 160. The control device 160 may include one or more processors.

The driving assistance apparatuses 50a and 50b and the control device 160 of the on-road camera 150 may each be communicably coupled to the data processing device 110 through one or more communication networks 105. For example, the driving assistance apparatuses 50a and 50b may be communicably coupled to the data processing device 110 through a mobile communication network. The control device 160 of the on-road camera 150 may be communicably coupled to the data processing device 110 through a wireless or wired communication network. Further, the driving assistance apparatus 50a of the first vehicle 1a and the driving assistance apparatus 50b of the second vehicle 1b may be communicably coupled to each other through a vehicle-to-vehicle communication system 120.

The vehicle 1 may transmit position data of the vehicle 1 to the data processing device 110 at a predetermined calculation cycle. The position data of the vehicle 1 may include data on a current position of the vehicle 1 on map data, data on a moving direction of the vehicle 1, and data on a moving speed of the vehicle 1. The driving assistance apparatus 50 may acquire data on a latitude and a longitude as the data on the current position of the vehicle 1, based on satellite signals transmitted from a satellite system such as a global positioning system (GPS). Further, the driving assistance apparatus 50 may calculate data on the moving direction and the moving speed of the vehicle 1, based on, for example, changes in the current position of the vehicle 1 acquired in time series.

Additionally, the vehicle 1 may include a surrounding environment recognition device. When the first vehicle 1a is assumed to be a vehicle to be assisted, the surrounding environment recognition device provided on the second vehicle 1b may correspond to an environment recognition device provided at a location other than the first vehicle 1a. The surrounding environment recognition device may include one or more sensors out of, for example, a camera, a LiDAR, a radar sensor, and an ultrasonic sensor. The driving assistance apparatus 50 of the vehicle 1 may execute a surrounding environment recognition process to acquire measurement data from the corresponding surrounding environment recognition device at a predetermined calculation cycle and detect a surrounding environment of the vehicle 1.

For example, through the surrounding environment recognition process, the driving assistance apparatus 50 may detect, for example, a mobile body such as a vehicle, a bicycle, or a pedestrian, a guardrail, a curbstone, a building or other stationary object, and a boundary line of a traveling lane that exist in a recognizable surrounding region of each of the surrounding environment recognition devices. Further, the driving assistance apparatuses 50a and 50b of the first vehicle 1a and the second vehicle 1b may transmit and receive, to and from each other through the vehicle-to-vehicle communication system 120, data on a measurement result based on the measurement data of the corresponding surrounding environment recognition device together with data on a measurement range of the corresponding surrounding environment recognition device and the position data of the vehicle 1.

The "data on the measurement result obtained by the surrounding environment recognition device" may include data on a type of a recognized object and data on a position, a moving direction, and a moving speed of the object in the measurement range of the surrounding environment recognition device. The "data on the measurement range of the surrounding environment recognition device" may be set in advance in accordance with, for example, specifications of sensors and recorded in the driving assistance apparatus 50 as a range in which accuracy of the measurement result may be guaranteed for each sensor. The "data on the measurement range of the surrounding environment recognition device" may include, for example, data on an inclination of a central axis of the measurement range with respect to a front-rear direction of the vehicle 1, data on an angle of the measurement range around the central axis, and data on a distance of the measurement range in a direction of the central axis.

In one embodiment, the on-road camera 150 may serve as an "environment recognition device". The on-road camera 150 may be installed, for example, on a road or a building. The control device 160 of the on-road camera 150 may acquire imaging data obtained by imaging the measurement range at a predetermined calculation cycle. The control device 160 of the on-road camera 150 may execute an object recognition process using the imaging data. Note that, however, the environment recognition device is not limited to the on-road camera 150, and may be a LiDAR, a radar sensor, an ultrasonic camera, or other device configured to execute the object recognition process that is installed at a predetermined position.

In an embodiment of the disclosure, the control device 160 of the on-road camera 150 may detect a mobile body such as a vehicle, a bicycle, or a pedestrian at a predetermined calculation cycle. The control device 160 of the on-road camera 150 may execute the object recognition process of calculating a moving direction and a moving speed of the mobile body, based on changes in the detected position of the mobile body over time. The control device 160 of the on-road camera 150 may transmit the data on the measurement result obtained by the object recognition process and the data on the measurement range of the on-road camera 150 on the map data to the data processing device 110 at a predetermined calculation cycle.

The "data on the measurement result obtained by the on-road camera 150" may include data on the type of the recognized object and data on the position, the moving direction, and the moving speed of the object in the measurement range of the on-road camera 150. The "data on the measurement range of the on-road camera 150" may include, for example, data on an installation position of the on-road camera 150 and data on an angle of view and an imaging direction of the on-road camera 150. The data on the installation position of the on-road camera 150 may be recorded in the control device 160 in advance as, for example, the data on the longitude and the latitude on the map data. Additionally, the data on the angle of view and the imaging direction of the on-road camera 150 may be recorded in the control device 160 as, for example, values of vectors in a coordinate system having the longitude and the latitude as xy axes. The data on the angle of view and the imaging direction of the on-road camera 150 may be recorded in the control device 160 as data on the inclination with respect to a direction in which the road where the on-road camera 150 is installed extends.

The data processing device 110 may be communicably coupled to the control device 160 of the on-road camera 150 and the driving assistance apparatuses 50*a* and 50*b* through the communication network 105 by, for example, a cloud computing technique. The data processing device 110 may receive the data on the measurement range and the data on the measurement result of the on-road camera 150 from the control device 160 of the on-road camera 150 at a predetermined calculation cycle. The data on the measurement result may include the data on the type of the detected mobile body and the data on the position, the moving direction, and the moving speed of the mobile body.

Further, the data processing device 110 may receive the position data of the vehicle 1 from the driving assistance apparatus 50 at a predetermined calculation cycle. The data processing device 110 may identify the on-road camera 150 that exists in a predetermined area corresponding to the position of the vehicle 1 to be assisted. The data processing device 110 may transmit, to the driving assistance apparatus 50, the data on the measurement range and the data on the measurement result obtained by the on-road camera 150 received from the control device 160 of the on-road camera 150. In other words, the data processing device 110 may collect the data from the on-road camera 150 and provide the vehicle 1 to be assisted with the data on other mobile bodies that exist in the area around a traveling position of the vehicle 1 to be assisted.

When the first vehicle 1*a* is assumed to be the vehicle to be assisted, the driving assistance apparatus 50*a* of the first vehicle 1*a* may acquire the data on the measurement range and the data on the measurement result of the on-road camera 150 through the communication network 105. Further, the driving assistance apparatus 50*a* of the first vehicle 1*a* to be assisted may acquire, through the vehicle-to-vehicle communication system 120, the data on the measurement range and the data on the measurement result of the environment recognition device provided on the second vehicle 1*b*. The first vehicle 1*a* may execute a process of alerting a driver who drives the first vehicle 1*a* by providing a predetermined display that is visually recognizable by the driver, based on the data on the measurement range and the data on the measurement result of the on-road camera 150, and the data on the measurement range and the data on the measurement result of the environment recognition device provided on the second vehicle 1*b*.

Hereinafter, configurations and operations of the on-road camera 150, the data processing device 110, and the driving assistance apparatus 50 will be described in detail.

2. On-Road Camera

First, the on-road camera 150 as an example of the environment recognition device will be described in detail.

2-1. Configuration

FIG. 2 is a block diagram illustrating a configuration of the on-road camera 150.

The on-road camera 150 may include an image generating unit 151 and the control device 160. The image generating unit 151 may include, for example, an image sensor such as a charge coupled device (CCD) or a complementary metal-oxide semiconductor (CMOS) and generate image data of a measurement range. The image generating unit 151 may generate the image data and transmit the generated image data to the control device 160 at a predetermined calculation cycle.

The control device 160 may include a communicator 161, a processor 163, and a storage 169. The communicator 161 may be an interface used to communicate with the data processing device 110 through the communication network 105. The processor 163 may include one or more central processing units (CPUs) such as graphics processing units (GPU). The processor 163 may execute a computer program stored in the storage 169 to transmit, to the data processing device 110, data on a measurement result based on the image data transmitted from the image generating unit 151 at a predetermined calculation cycle.

The storage 169 may include one or more memories and store the computer program to be executed by the processor 163, various parameters to be used for a calculation process, and data on a calculation result. A part of the storage 169 may be used as a work area of the processor 163.

The storage 169 may include: a magnetic medium such as a hard disk, a floppy disk, or a magnetic tape; an optical recording medium such as a compact disk read-only memory (CD-ROM), a digital versatile disk (DVD), or Blu-ray (registered trademark); a magneto-optical medium such as a floptical disk; a storage element such as a random-access memory (RAM) or a read-only memory (ROM); a flash memory such as a universal serial bus (USB) memory or a solid state drive (SSD); or any other recording medium.

The processor 163 may include an image processor 165 and a communication control processor 167. The processes to be executed by the image processor 165 and the communication control processor 167 may be implemented by the processor executing computer programs. The image processor 165 may execute the object recognition process, based on the image data transmitted from the image generating unit 151 at the predetermined calculation cycle. The on-road camera 150 may mainly recognize a mobile body such as another vehicle, a pedestrian, or a bicycle. Further, the image processor 165 may execute a process to calculate a position, a moving speed, and a moving direction of the recognized mobile body.

The communication control processor 167 may transmit the data on the measurement result of the object obtained by the image processor 165 to the data processing device 110 at the predetermined calculation cycle. The data on the measurement result of the object may include the data on the type of the object and the data on the position, the moving speed, and the moving direction of the object in the measurement range of the on-road camera 150. At this time, the communication control processor 167 may also transmit the data on the measurement range of the on-road camera 150 to the data processing device 110. The data on the measurement range of the on-road camera 150 may include the data on the installation position, the angle of view, and the imaging direction of the on-road camera 150. The data on the measurement range of the on-road camera 150 may be recorded in advance in the storage 169. When the data processing device 110 includes a database in which the data on the measurement ranges of on-road cameras 150 is recorded, the on-road camera 150 may transmit, to the data processing device 110, identification data that identifies the individual on-road cameras 150.

2-2. Processing Operation

FIG. 3 illustrates a flowchart of a processing operation performed by the control device 160 of the on-road camera 150. The flowchart illustrated in FIG. 3 may be repeatedly executed at a predetermined calculation cycle.

The image processor 165 of the processor 163 may acquire the image data transmitted from the image generating unit 151 (step S11).

Thereafter, the image processor 165 may execute the object recognition process, based on the received image data (step S13). For example, the image processor 165 may perform a process including extracting feature points from the image data using a technique such as an edge detection process, matching with data on the feature points of various objects stored in advance (also referred to as a pattern matching process), and recognizing an object that exists in the measurement range. The on-road camera 150 may mainly recognize a mobile body such as another vehicle, a pedestrian, or a bicycle.

Further, the image processor 165 may obtain the moving speed and the moving direction of the recognized mobile body in the real space by calculation. For example, the image processor 165 may be configured to obtain the moving speed and the moving direction of the mobile body in the real space by calculation, based on changes in a position and a size of the mobile body over time in the image data transmitted at the predetermined calculation cycle. Note that, however, the method of calculating the speed and the moving direction of the recognized mobile body may be executed using an existing technique, and is not limited to a particular method.

Thereafter, the communication control processor 167 may transmit the data on the measurement result of the object obtained by the image processor 165 and the data on the measurement range of the on-road camera 150 to the data processing device 110 (step S15). The control device 160 may repeatedly execute the above-described processes of steps S11 to S15 at the predetermined calculation cycle.

Note that the control device 160 may constantly transmit the data on the measurement range and the data on the measurement result of the on-road camera 150 to the data processing device 110. Alternatively, the control device 160 may transmit the data on the measurement range and the data on the measurement result of the on-road camera 150 after receiving a transmission request from the data processing device 110.

3. Data Processing Device

Next, the data processing device 110 will be described in detail.

3-1. Configuration

FIG. 4 is a block diagram illustrating a configuration of the data processing device 110.

The data processing device 110 may include a communicator 111, a processor 113, and a storage 119. The communicator 111 may be an interface used to communicate with the on-road camera 150 and the driving assistance apparatus 50 through the communication network 105. The processor 113 may include one or more CPUs. The processor 113 may acquire the data transmitted from the on-road camera 150 and the driving assistance apparatus 50 at the predetermined calculation cycle. The processor 113 may transmit, to the driving assistance apparatus 50, the data acquired from the on-road camera 150 that exists in a predetermined area corresponding to the position of the driving assistance apparatus 50 of the vehicle 1 to be assisted.

The storage 119 may include one or more memories and store a computer program to be executed by the processor 113, various parameters to be used for a calculation process, and data on a calculation result. A part of the storage 119 may be used as a work area of the processor 113. The storage 119 may include: a magnetic medium such as a hard disk, a floppy disk, or a magnetic tape; an optical recording medium such as a CD-ROM, a DVD, or Blu-ray (registered trademark); a magneto-optical medium such as a floptical disk; a storage element such as a RAM or a ROM; a flash memory such as a USB memory or an SSD; or any other recording medium.

The processor 113 may include a data processor 115 and a communication control processor 117. The processes to be executed by the data processor 115 and the communication control processor 117 may be implemented by the processor executing computer programs. The data processor 115 may identify the position of the vehicle 1 to be assisted on the map data, based on the position data of the vehicle 1 transmitted from the driving assistance apparatus 50. The data processor 115 may identify the on-road camera 150 that exists within an area having a predetermined radius from the position of the vehicle 1. The communication control processor 117 may transmit, to the driving assistance apparatus 50, the data on the measurement range and the data on the measurement result of the on-road camera 150 received from the identified on-road camera 150.

The data processor 115 may identify the on-road camera 150 installed on a road that leads to (or intersects with) the road in the moving direction of the vehicle 1, based on the position data, the moving direction, and the moving speed of the vehicle 1 transmitted from the driving assistance apparatus 50. This makes it possible to prevent data other than that used for predicting contact between the vehicle 1 to be assisted and the mobile body that may possibly come into contact from being transmitted to the driving assistance apparatus 50. As a result, it is possible to reduce a load on a calculation process of the data processing device 110 and the driving assistance apparatus 50.

3-2. Processing Operation

FIG. 5 is a flowchart of the processing operation performed by the data processing device 110. The flowchart illustrated in FIG. 5 may be repeatedly executed at a predetermined calculation cycle. The following description gives an example of a case where the first vehicle 1a is a vehicle to be assisted.

The data processor 115 of the processor 113 may acquire the data on the measurement range and the data on the measurement result of the on-road camera 150 transmitted from one or more on-road cameras (the environment recognition devices) 150 (step S21). The data on the measurement range and the data on the measurement result of the on-road camera 150 may be data that allows the driver to grasp which type of the mobile body is moving in which direction at which position and what speed.

Thereafter, the data processor 115 may acquire the position data of the first vehicle 1a and the data on the moving direction and the moving speed of the first vehicle 1a from the driving assistance apparatus 50a mounted on the first vehicle 1a to be assisted (step S23). The position data of the first vehicle 1a may be data indicating the position of the first vehicle 1a on the map data, and may be represented by, for example, the longitude and the latitude.

Thereafter, the data processor 115 may identify the on-road camera 150 that exists within a predetermined distance from the position of the first vehicle 1a to be assisted (step S25). For example, the data processor 115 may identify the on-road camera 150 that exists within the area having the predetermined radius from the position of the first vehicle 1a. In the example embodiment, the data processor 115 may further identify the on-road camera 150 installed on the road that leads to (or intersects with) the road in the moving direction of the first vehicle 1a, based on the data on the moving direction and the moving speed of the first vehicle 1a.

Thereafter, the communication control processor 117 may transmit, to the vehicle 1 to be assisted, the data on the measurement range and the data on the measurement result of the on-road camera 150 each acquired from the identified on-road camera 150 (step S27). The data processing device 110 may repeatedly execute the above-described processes of steps S21 to S27 at the predetermined calculation cycle.

Note that the data processing device 110 may request the on-road camera 150 to transmit the data on the measurement range and the data on the measurement result of the on-road camera 150 after the data processing device 110 has identified the on-road camera 150 that exists within the predetermined distance from the position of the vehicle 1 to be assisted. In this case, after making the transmission request, the data processing device 110 may acquire the data on the measurement range and the data on the measurement result of the on-road camera 150 transmitted from the on-road camera 150 at the predetermined calculation cycle.

4. Driving Assistance Apparatus

4-1. Vehicle

Before describing a configuration of the driving assistance apparatus 50 according to the example embodiment of the disclosure, a description will be given of an example of an overall configuration of the vehicle 1 to be assisted on which the driving assistance apparatus 50 is mounted.

FIG. 6 is a schematic diagram illustrating a configuration example of the vehicle 1 including the driving assistance apparatus 50.

The vehicle 1 may be configured as a two-wheel drive four-wheeled vehicle that transmits, to a left front wheel and a right front wheel, a drive torque outputted from a drive source 9 that generates the drive torque. The drive source 9 may be an internal combustion engine such as a gasoline engine or a diesel engine, or may be a drive motor. Further, the vehicle 1 may include both an internal combustion engine and a drive motor as the drive source 9.

Note that the vehicle 1 may be a four-wheel-drive vehicle that transmits a drive torque to front wheels and rear wheels. Further, the vehicle 1 may be, for example, an electric vehicle provided with two drive motors including a front wheel drive motor and a rear wheel drive motor, or an electric vehicle including drive motors corresponding to respective wheels. When the vehicle 1 is an electric vehicle or a hybrid electric vehicle, the vehicle 1 may be equipped with a secondary battery that accumulates electric power to be supplied to the drive motor, and a generator such as a motor or a fuel cell that generates electric power to be charged in the battery.

The vehicle 1 may include, as devices used to control driving of the vehicle 1, the drive source 9, an electric steering device 15, and braking devices 17LF, 17RF, 17LR, and 17RR. Hereinafter, the braking devices 17LF, 17RF, 17LR, and 17RR may be collectively referred to as a "braking device 17" when it is not necessary to specifically distinguish them from one another. The drive source 9 may output a drive torque to be transmitted to a front wheel drive shaft 5F through a non-illustrated transmission and a differential mechanism 7. Driving of the drive source 9 and the transmission may be controlled by a vehicle control processor 41 including one or more electronic control units (ECUs).

The electric steering device 15 may be provided on the front wheel drive shaft 5F. The electric steering device 15 may include an electric motor and a gear mechanism that are not illustrated, and may be controlled by the vehicle control processor 41 to adjust a steering angle of the front wheels. During manual driving, the vehicle control processor 41 may control the electric steering device 15, based on the steering angle of a steering wheel 13 steered by the driver. Further, during automated driving, the vehicle control processor 41 may control the electric steering device 15, based on a set steering angle or a set steering angular speed.

The braking devices 17LF, 17RF, 17LR, and 17RR may apply a braking force to respective wheels. The braking device 17 may be configured as, for example, a hydraulic braking device. The vehicle control processor 41 may adjust the hydraulic pressure to be supplied to each braking device 17 by controlling driving of a hydraulic unit 16. When the vehicle 1 is an electric vehicle or a hybrid electric vehicle, the braking device 17 may be used in combination with regenerative braking that uses the drive motor.

The vehicle control processor 41 may include one or more electronic control units that control driving of the drive source 9, the electric steering device 15, and the hydraulic unit 16. When the vehicle 1 includes a transmission that shifts the output from the drive source 9 and transmits the shifted output to the wheels, the vehicle control processor 41 may control driving of the transmission. The vehicle control processor 41 may be configured to acquire the data transmitted from the driving assistance apparatus 50, and may be configured to execute automated driving control of the vehicle 1.

Further, the vehicle 1 may include front imaging cameras 31LF and 31RF, a rear imaging camera 31R, a vehicle position detection sensor 33, and a display 43.

The front imaging cameras 31LF and 31RF and the rear imaging camera 31R may configure the surrounding environment recognition device that acquires data on the surrounding environment of the vehicle 1. The front imaging cameras 31LF and 31RF may capture an image of a region ahead of the vehicle 1 and generate image data. The rear imaging camera 31R may capture an image of a region rearward of the vehicle 1 and generate image data. The front imaging cameras 31LF and 31RF and the rear imaging camera 31R may include an image sensor such as a charge coupled device (CCD) or a complementary metal-oxide semiconductor (CMOS), and transmit the generated image data to the driving assistance apparatus 50. In the vehicle 1 illustrated in FIG. 6, the front imaging cameras 31LF and 31RF may be configured as a stereo camera including a pair of left and right cameras, but may be monocular cameras 31LF and 31RF.

Note that, in addition to the front imaging cameras 31LF and 31RF and the rear imaging camera 31R, the surrounding environment recognition device may include, for example, a camera that is provided on a side mirror and captures an image of a left rear region or a right rear region. Additionally, a surrounding environment recognition device may include any one or more of sensors out of light detection and ranging (LiDAR), a radar sensor such as a millimeter-wave radar, and an ultrasonic sensor.

The vehicle position detection sensor 33 may receive satellite signals from positioning satellites of a global navigation satellite system (GNSS) typified by a global positioning system (GPS) satellite. The vehicle position detection sensor 33 may transmit, to the driving assistance apparatus 50, the position data of the vehicle 1 included in the received satellite signal. Note that, in addition to the GPS sensor, the vehicle position detection sensor 33 may be provided with an antenna that receives satellite signals from other satellite systems that identify the position of the vehicle 1.

The display 43 may be driven by the driving assistance apparatus 50 and display various kinds of data that is visually recognizable by the driver. The display 43 may be, for example, a display provided in an instrument panel or a display of a navigation system. When the display 43 is, for example, a display panel, a display screen of the display 43 may correspond to an image display. Alternatively, the display 43 may be a head-up display (HUD) that displays data that is visually recognizable by the driver on a front windshield in a superimposed manner on a real space around the vehicle 1. When the display 43 is the HUD, the front windshield may correspond to the image display.

Note that, in the following description, an example of a case where the display 43 is a display that is not the HUD and is configured to display the map data will be described.

4-2. Driving Assistance Apparatus

Next, the driving assistance apparatus 50 according to the example embodiment will be described in detail.

4-2-1. Configuration Example

The driving assistance apparatus 50 is configured to implement operation as an apparatus that assists driving of the vehicle 1 driven by the driver when a processor such as one or more CPUs executes a computer program. The computer program may be a computer program that causes the processor to execute a later-described operation to be executed by the driving assistance apparatus 50. The computer program to be executed by the processor may be recorded in a recording medium serving as a storage (memory) 57 provided in the driving assistance apparatus 50. Alternatively, the computer program to be executed by the processor may be recorded in a recording medium built in the driving assistance apparatus 50 or any recording medium externally attachable to the driving assistance apparatus 50.

The recording medium that records the computer program may include: a magnetic medium such as a hard disk, a floppy disk, or a magnetic tape; an optical recording medium such as a CD-ROM, a DVD, or Blu-ray (registered trademark); a magneto-optical medium such as a floptical disk; a storage element such as a RAM or a ROM; a flash memory such as a USB memory or an SSD; or any other medium that is able to store programs.

FIG. 7 is a block diagram illustrating a configuration example of the driving assistance apparatus 50 according to the example embodiment.

The driving assistance apparatus 50 may be coupled to a surrounding environment recognition device (for example, the front imaging cameras 31LF and 31RF and the rear imaging camera 31R) 31, the vehicle position detection sensor 33, the vehicle control processor 41, and the display 43 through a communication system such as a dedicated line, a controller area network (CAN), or a local interconnect network (LIN). Note that the driving assistance apparatus 50 is not limited to an electronic control unit mounted on the vehicle 1, and may be a terminal device such as a touchpad or a wearable device.

The driving assistance apparatus 50 may include a communicator 51, a vehicle-to-vehicle communicator 53, a processor 55, the storage 57, and a map data storage 59. The processor 55 may include one or more processors such as CPUs and various peripheral components. Part or all of the processor 55 may include updatable software such as firmware, or may be, for example, a program module executed by a command from, for example, a CPU. In one embodiment, the storage 57 may serve as a "non-transitory recording medium".

<Communicator>

The communicator 51 may be an interface used to communicate with the data processing device 110. The driving assistance apparatus 50 may transmit and receive data to and from the data processing device 110 through the communicator 51.

<Vehicle-to-Vehicle Communicator>

The vehicle-to-vehicle communicator 53 may be an interface used to communicate with another vehicle that exists within the predetermined distance from the vehicle 1. The driving assistance apparatus 50 may transmit and receive data to and from the other vehicle through the vehicle-to-vehicle communicator 53.

<Storage>

The storage 57 may include one or more storage media such as a RAM or a ROM, an HDD, a CD, a DVD, an SSD, a USB flash, or a storage device that are communicably coupled to the processor 55. Note that, however, the storage 57 is not particularly limited in kind or number. The storage 57 may store data such as a computer program to be executed by the processor 55, various parameters to be used for a calculation process, detection data, and a calculation result. A part of the storage 57 may be used as a work area of the processor 55.

In the example embodiment, the storage 57 may store data on the measurement ranges of the front imaging cameras 31LF and 31RF and the rear imaging camera 31R that configure the surrounding environment recognition device 31. The data on the measurement ranges of the front imaging cameras 31LF and 31RF and the rear imaging camera 31R may include, for example, data on an inclination of a central axis of the measurement range with respect to the front-rear direction of the vehicle 1, data on an angle of the measurement range around the central axis, and data on a distance of the measurement range in a direction of the central axis.

<Map Data Storage>

The map data storage 59 may include a storage element such as a RAM or a ROM, or a storage medium such as an HDD, a CD, a DVD, an SSD, a USB flash, or a storage device that is communicably coupled to the processor 55. The map data stored in the map data storage 59 may be configured to be associated with the position of the vehicle 1, based on the position data detected by the vehicle position detection sensor 33. For example, the map data may be associated with the data on the latitude and the longitude. This makes it possible for the processor 55 to identify the position of the vehicle 1 on the map data, based on the data on the latitude and the longitude of the vehicle 1 detected by the vehicle position detection sensor 33.

<Processor>

The processor 55 may include a communication control processor 61, a vehicle-to-vehicle communication control processor 63, a vehicle data obtainer 65, a surrounding environment recognition processor 67, and a display control processor 69. The processes to be executed by the communication control processor 61, the vehicle-to-vehicle communication control processor 63, the vehicle data obtainer 65, the surrounding environment recognition processor 67, and the display control processor 69 may be implemented by the processor executing computer programs. Note that a part of the communication control processor 61, the vehicle-to-vehicle communication control processor 63, the vehicle data obtainer 65, the surrounding environment recognition processor 67, and the display control processor 69 may include hardware such as an analog circuit.

The communication control processor 61 may transmit the position data of the vehicle 1 transmitted from the vehicle position detection sensor 33 to the data processing device 110 at the predetermined calculation cycle. The communication control processor 61 may transmit data on the moving direction and the moving speed of the vehicle 1 to the data processing device 110 together with the position data of the vehicle 1. Further, the communication control processor 61 executes an acquiring process of acquiring the data on the measurement range and the data on the measurement result of the on-road camera 150 transmitted from the data processing device 110.

The vehicle-to-vehicle communication control processor 63 may communicate with another vehicle that exists within the predetermined distance from the vehicle 1 at a predetermined calculation cycle. The vehicle-to-vehicle communication control processor 63 may transmit, to the other vehicle, the position data of the vehicle 1, and the data on the measurement range and the data on the measurement result of the surrounding environment recognition device 31 mounted on the vehicle 1. The data on the measurement result obtained by the surrounding environment recognition device 31 may include data indicating the result of the surrounding environment recognition process performed by the surrounding environment recognition processor 67. The data on the measurement range of the surrounding environment recognition device 31 may be recorded in advance in the storage 57.

Additionally, the vehicle-to-vehicle communication control processor 63 may communicate with another vehicle that exists within the predetermined distance from the vehicle 1. The vehicle-to-vehicle communication control processor 63 executes an acquiring process of acquiring data on a position of the other vehicle, and data on a measurement range and data on a measurement result of a surrounding environment recognition device mounted on the other vehicle.

The vehicle data obtainer 65 may acquire data related to traveling of the vehicle 1. The vehicle data obtainer 65 may acquire the position data of the vehicle 1 transmitted from the vehicle position detection sensor 33. Further, the vehicle data obtainer 65 may calculate the moving direction and the moving speed of the vehicle 1, based on changes in the position data of the vehicle 1. For example, the vehicle data obtainer 65 may be configured to calculate the moving speed of the vehicle 1 by dividing a distance from a position of the vehicle 1 acquired in the previous calculation cycle to a position of the vehicle 1 acquired in the current calculation cycle by a unit time corresponding to the calculation cycle. The vehicle data obtainer 65 may calculate the moving speed of the vehicle 1, based on sensor signals of a wheel speed sensor or a vehicle speed sensor, which are not illustrated.

The surrounding environment recognition processor 67 may execute the surrounding environment recognition process using the measurement data transmitted from the surrounding environment recognition device 31 mounted on the vehicle 1. The surrounding environment recognition processor 67 may detect a mobile body and a stationary object around the vehicle 1 through the surrounding environment recognition process. The details of the process performed by the surrounding environment recognition processor 67 will be described later.

The display control processor 69 executes a process of causing the display 43 to display the data on the measurement range and the data on the measurement result of the environment recognition device provided at a location other than the vehicle 1 on the map data in a superimposed manner as data that is visually recognizable by the driver of the vehicle 1. The data on the measurement range and the data on the measurement result of the environment recognition device provided at a location other than the vehicle 1 may include: the data on the measurement range and the data on the measurement result of the on-road camera 150 acquired from the data processing device 110; and the data on the measurement range and the data on the measurement result of the surrounding environment recognition device mounted on the other vehicle acquired from the other vehicle.

4-2-2. Processing Operation

FIG. 8 is a flowchart of a main routine of a processing operation performed by the processor 55 of the driving assistance apparatus 50. The flowchart illustrated in FIG. 8 may be repeatedly executed at a predetermined calculation cycle in a state in which an operation of the technique of the disclosure is activated. Further, the following description gives an example of a case where the first vehicle 1a is a vehicle to be assisted and the second vehicle 1b is the other vehicle.

When the processor 55 of the driving assistance apparatus 50a mounted on the first vehicle 1a detects activation of an assistance operation by the driving assistance apparatus 50a (step S31), the vehicle data obtainer 65 may acquire the position data of the first vehicle 1a transmitted from the vehicle position detection sensor 33 (step S33). The assistance operation according to an embodiment of the disclosure may be activated when the system of the first vehicle 1a is activated, or may be activated by an input operation by, for example, a driver who drives the vehicle 1a. The position data of the first vehicle 1a may be identified as, for example, the data on the latitude and the longitude.

Thereafter, the vehicle data obtainer 65 may calculate the moving direction and the moving speed of the first vehicle 1a (step S35). For example, the vehicle data obtainer 65 may calculate the moving direction and the moving speed of the first vehicle 1a, based on the acquired position data of the first vehicle 1a and the position data of the first vehicle 1a acquired in a past calculation cycle. The moving direction of the first vehicle 1a may be calculated as a direction in which the position indicated by the position data of the first vehicle 1a changes. The moving speed of the first vehicle 1a may be calculated by, for example, dividing the distance from the position of the first vehicle 1a acquired in the previous calculation cycle to the position of the first vehicle 1a acquired in the current calculation cycle by the unit time corresponding to the calculation cycle.

Note that it is also possible for the vehicle data obtainer 65 to calculate the moving speed of the first vehicle 1a, based on the sensor signals of the wheel speed sensor or the vehicle speed sensor. Further, when the position data of the vehicle 1 transmitted from the vehicle position detection sensor 33 includes data on an orientation of the vehicle 1, the vehicle data obtainer 65 may calculate the moving direction of the vehicle 1, based on the data.

Thereafter, the communication control processor 61 may transmit the position data, the data on the moving direction, and the data on the moving speed of the first vehicle 1a acquired in the current calculation cycle to the data processing device 110 (step S37). The position data, the data on the moving direction, and the data on the moving speed of the first vehicle 1a transmitted here correspond to the data acquired by the data processing device 110 in step S23 of the processing operation of the data processing device 110 illustrated in FIG. 5.

Thereafter, the communication control processor 61 may acquire, from the data processing device 110, the data on the measurement range and the data on the measurement result of the on-road camera (the environment recognition device) 150 (step S39). The data on the measurement range and the data on the measurement result of the on-road camera (the environment recognition device) 150 received here correspond to the data transmitted by the data processing device 110 in step S27 of the processing operation of the data processing device 110 illustrated in FIG. 5. For example, the driving assistance apparatus 50a may acquire, from the data processing device 110, data on the object detected by the on-road camera 150 that exists within the predetermined distance from the position of the first vehicle 1a together with the data on the measurement range of the on-road camera 150.

Thereafter, the vehicle-to-vehicle communication control processor 63 may acquire, from the other vehicle (the second vehicle 1b), the data on the measurement range and the data on the measurement result of the surrounding environment recognition device mounted on the other vehicle (the second vehicle 1b) through the vehicle-to-vehicle communication system 120 (step S41). For example, the driving assistance apparatus 50a may communicate with the second vehicle 1b that exists within the predetermined distance from the first vehicle 1a. The driving assistance apparatus 50a may acquire, from the driving assistance apparatus 50b of the second vehicle 1b, the data on the object detected by the surrounding environment recognition device of the second vehicle 1b together with the data on the measurement range of the surrounding environment recognition device of the second vehicle 1b.

Note that the data on the measurement range acquired from the second vehicle 1b in step S41 may include data obtainable as a result of the surrounding environment recognition process executed in the second vehicle 1b. The second vehicle 1b may transmit the data on the result of the surrounding environment recognition process to the first vehicle 1a together with the data on the measurement range of the surrounding environment recognition device.

When, for example, the second vehicle 1b has a configuration similar to that of the first vehicle 1a, the driving assistance apparatus 50b of the second vehicle 1b may transmit, for example, the data on the inclination of the central axis of the measurement range of each of the front imaging cameras 31LF and 31RF and the rear imaging camera 31R with respect to the front-rear direction of the vehicle 1, the data on the angle of the measurement range around the central axis, and the data on the distance of the measurement range in the direction of the central axis, to the driving assistance apparatus 50a of the first vehicle 1a. Additionally, the driving assistance apparatus 50b of the second vehicle 1b may transmit, to the driving assistance apparatus 50a of the first vehicle 1a, the data on the position, the moving direction, and the moving speed of the object detected by the front imaging cameras 31LF and 31RF and the rear imaging camera 31R within the measurement range.

Thereafter, the surrounding environment recognition processor 67 may acquire the measurement data transmitted from the surrounding environment recognition device 31 (in the example embodiment, the front imaging cameras 31LF and 31RF and the rear imaging camera 31R) provided on the first vehicle 1a (step S43). Thereafter, the surrounding environment recognition processor 67 may execute the surrounding environment recognition process using the acquired measurement data (step S45).

FIG. 9 is a flowchart illustrating an example of the surrounding environment recognition process performed by the surrounding environment recognition processor 67.

The surrounding environment recognition processor 67 may extract feature points from the measurement data acquired from the surrounding environment recognition device 31 (step S51). For example, the surrounding environment recognition processor 67 may extract feature points from the image data generated by the front imaging cameras 31LF and 31RF and the rear imaging camera 31R using a technique such as an edge detection process.

Thereafter, the surrounding environment recognition processor 67 may match the extracted feature points with the data on the feature points of various objects stored in advance by a matching process (also referred to as a pattern matching process) to detect an object and identify the type of the object and the position of the object in the real space (step S53). The surrounding environment recognition processor 67 may identify the type of the object to be detected by matching a feature point group that has been extracted with pieces of data on feature point groups representing, for example, a mobile body such as a vehicle, a bicycle, or a pedestrian, a guardrail, a curbstone, a building or other stationary object, and a boundary line of a traveling lane. Further, the surrounding environment recognition processor 67 may identify the position of the object in the real space, based on the position of the object in the measurement range and the distance to the object.

Thereafter, the surrounding environment recognition processor 67 may calculate the moving direction and the moving speed of the detected object in the real space (step S55). For example, the surrounding environment recognition processor 67 may calculate the moving direction and the moving speed of the object in the real space, based on changes in the position of the same object over time, using the measurement data acquired in the current calculation cycle and the measurement data acquired in the past calculation cycle.

Note that the surrounding environment recognition process executed in steps S51 and S53 may be executed using an existing technique, and is not limited to a particular technique. For example, when one of the surrounding environment recognition devices is a LiDAR, a process of calculating the moving speed performed by the surrounding environment recognition processor 67 may be omitted because the measurement data includes data on a speed of a measurement point.

Thereafter, the surrounding environment recognition processor 67 may record the data on the type, the position, the moving direction, and the moving speed of the detected object in the storage 57 together with time data as the data on the measurement result (step S57).

Thereafter, the surrounding environment recognition processor 67 may determine whether there is another vehicle (the second vehicle 1b) that performs vehicle-to-vehicle communication with the first vehicle 1a (step S59). For example, the surrounding environment recognition processor 67 may determine whether there is another vehicle in which the vehicle-to-vehicle communication control processor 63 performs vehicle-to-vehicle communication. When it is not determined that there is another vehicle that performs the vehicle-to-vehicle communication (S59/No), the surrounding environment recognition processor 67 may end the surrounding environment recognition process.

In contrast, when it is determined that there is another vehicle that performs the vehicle-to-vehicle communication (S59/Yes), the surrounding environment recognition processor 67 may cause the vehicle-to-vehicle communication control processor 63 to transmit the data on the measurement range of the surrounding environment recognition device 31 recorded in the storage 57 in advance and the data on the measurement result recorded in the storage 57 in step S57 to the other vehicle (step S61). The data on the measurement range and the data on the measurement result transmitted here correspond to the data acquired by the vehicle to be assisted in step S41 of the flowchart illustrated in FIG. 8. After causing the data on the measurement range and the data on the measurement result to be transmitted to the other vehicle, the surrounding environment recognition processor 67 may end the surrounding environment recognition process.

Returning back to FIG. 8, the display control processor 69 thereafter executes a display process of causing the display 43 to display the data on the measurement range and the data on the measurement result of the on-road camera 150 acquired from the data processing device 110, and the data on the measurement range and the data on the measurement result of the surrounding environment recognition device of the other vehicle acquired from the other vehicle, in a superimposed manner on the map data as the data that is visually recognizable by the driver who drives the first vehicle 1a (step S47).

In the example embodiment, the environment recognition device from which the driving assistance apparatus 50a is to acquire the data on the measurement range and the data on the measurement result may include an environment recognition device whose position moves and an environment recognition device whose position does not move. For example, the on-road camera 150 may be the environment recognition device whose installation position is fixed, and the surrounding environment recognition device of the other vehicle may be the environment recognition device whose position moves.

Hereinafter, the display process performed by the display control processor 69 will be described separately for a first display process and a second display process. The first display process may cause the data on the measurement range and the data on the measurement result of the environment recognition device whose position does not move to be displayed. The second display process may cause the data on the measurement range and the data on the measurement result of the environment recognition device whose position moves to be displayed. Note that, however, the display control processor 69 may execute either the first display process or the second display process, or may simultaneously execute both the first display process and the second display process.

First, the first display process will be described. The first display process may be a process for a case where the measurement range of the environment recognition device in the real space does not change.

FIG. 10 is a flowchart of the first display process performed by the display control processor 69.

The display control processor 69 may read the data on the measurement range and the measurement result of the on-road camera 150 acquired from the data processing device 110 and recorded in the storage 57 (step S71).

Thereafter, the display control processor 69 may determine whether there is a mobile body moving toward a region located ahead in the moving direction of the first vehicle 1a, based on the data on the measurement range and the measurement result of the on-road camera 150 and the data on the position and the moving direction of the first vehicle 1a (step S73). For example, the display control processor 69 may map the first vehicle 1a and the mobile body on the map data in accordance with the position data (the latitude and the longitude) of the first vehicle 1a and the detected mobile body. Further, the display control processor 69 may determine whether there is a mobile body moving toward a region ahead of the first vehicle 1a on the road on which the first vehicle 1a is traveling, based on the data on the moving direction (a vector on the map data) of each of the first vehicle 1a and the mobile body.

The display control processor 69 may limit an area in which it is determined whether a mobile body exists, based on one or both of the moving direction and the moving speed of the first vehicle 1a. Further, the display control processor 69 may exclude, from a determination target, the mobile body that is unlikely to contact or approach the first vehicle 1a, based on a trajectory estimated from the moving direction and the moving speed of the mobile body and a trajectory estimated from the moving direction and the moving speed of the first vehicle 1a.

When it is determined that there is a mobile body moving toward the region located ahead in the moving direction of the first vehicle 1a (S73/Yes), the display control processor 69 may cause the detected mobile body to be superimposed and displayed on the map data in accordance with the detected position in the real space (step S75). Further, the display control processor 69 may cause the measurement range of the surrounding environment recognition device 31 of the first vehicle 1a and the measurement range of the on-road camera 150 to be superimposed and displayed on the map data (step S77). The display control processor 69 may convert the position data included in the measurement range and the measurement result of the on-road camera 150 acquired from the data processing device 110 and the position data included in the measurement range and the measurement result of the surrounding environment recognition device 31 of the first vehicle 1a into the data on the latitude and the longitude, and cause the converted pieces of data to be superimposed and displayed on the map data.

FIGS. 11 and 12 are diagrams that describe workings of the first display process.

FIG. 11 illustrates a traveling scene in which a second road 143 intersects a first road 141 on which the first vehicle 1a is traveling. Regions of the second road 143 around the corner at the intersection of the first road 141 and the second road 143 as viewed from the position of the first vehicle 1a may be blind spot regions 121a and 121b. Note that FIG. 11 does not represent what is displayed on the display 43.

In FIG. 11, the on-road camera 150 may be installed at a point where a third road 145 intersects the second road 143 and that is one block away from the first road 141 on which the first vehicle 1a is traveling. A measurement direction of the on-road camera 150 may be oriented toward the first road 141. The blind spot region 121a close to the on-road camera 150 may be included in a measurement range 153 of the on-road camera 150, while the blind spot region 121b may be outside the measurement range 153 of the on-road camera 150.

In this situation, assume that a first other vehicle 90 without the vehicle-to-vehicle communication system 120 passes through the second road 143 from the upper side to the lower side of the drawing. In this case, the first vehicle 1a that has acquired the data on the measurement result of the on-road camera 150 may notify the driver of the presence of the first other vehicle 90. This makes it possible for the driver to recognize in advance that the first other vehicle 90 will pass through the intersection. However, if there is a second other vehicle that passes through the second road 143 from the lower side to the upper side of the drawing after the first other vehicle 90 passes through the intersection, the first vehicle 1a may remain not notifying the driver of the presence of the second other vehicle because the on-road camera 150 does not detect the second other vehicle. This may possibly cause the driver to assume that there is no further passage of other vehicle after the first other vehicle 90 passes and enter the intersection without sufficiently checking or performing an avoidance behavior.

FIG. 12 is an explanatory diagram representing what is displayed by the first display process. FIG. 12 illustrates an example in which the followings are superimposed and displayed on the map data: the data on the first other vehicle 90 detected in the situation illustrated in FIG. 11, a measurement range 125 of the surrounding environment recognition device 31 of the first vehicle 1a, and the measurement range 153 of the on-road camera 150.

The display control processor 69 may cause the data indicating the first other vehicle 90 that is identified based on the data on the measurement result of the on-road camera 150 and acquired through the data processing device 110 to be superimposed and displayed at a detected position on the map data. Further, the display control processor 69 may cause the data indicating the measurement range 125 of the first vehicle 1a and the data indicating the measurement range 153 of the on-road camera 150 to be superimposed and displayed on the map data. In the example illustrated in FIG. 12, the entire range of the map data may be displayed as a gray transparent display, and the measurement range 125 of the first vehicle 1a and the measurement range 153 of the on-road camera 150 may be displayed in white.

This makes it possible for the driver who drives the first vehicle 1a to easily understand which region is covered by the data on the measurement result of the on-road camera 150 acquired from the data processing device 110 and the data on the measurement result of the surrounding environment recognition device 31 of the first vehicle 1a. Accordingly, it is possible to improve reliability felt by the driver for the data on the presence or absence of the mobile body displayed by the driving assistance apparatus 50a.

Additionally, it is possible to prompt the driver not only to pay attention to the detected mobile body, but also to a region not measured by the on-road camera 150 or the surrounding environment recognition device 31. This makes it possible for the driver to pay attention to the possibility that another vehicle enters the intersection from the outside of the measurement range 153 of the on-road camera 150 even after the first other vehicle 90 has passed.

Note that, in the example illustrated in FIG. 12, in terms of specifications, even in a region that is within the measurement range 125 of the first vehicle 1a and the measurement range 153 of the on-road camera 150, a region where, for example, a vehicle or a pedestrian is unable to pass through is indicated as a gray transparent display. This makes it possible for the driver to easily understand the range measured by the first vehicle 1a and the on-road camera 150 in the region where the mobile body such as another vehicle, a bicycle, or a pedestrian is movable.

The data on the mobile body to be superimposed and displayed on the map data may be any of a figure, a character, and an icon as long as it is data that allows the driver to distinguish the type of the mobile body. Alternatively, the data on the mobile body to be superimposed and displayed on the map data may be an image of the mobile body captured by the on-road camera 150.

Further, the data on the measurement range 153 of the on-road camera 150 and the measurement range 125 of the surrounding environment recognition device 31 is not limited to a particular display as long as it is a display that allows the driver to distinguish from a region outside the measurement range. For example, the display control processor 69 may display the measurement range 153 of the on-road camera 150 and the measurement range 125 of the surrounding environment recognition device 31 in a color different from that of other regions. Additionally, the display control processor 69 may display the measurement range 153 of the on-road camera 150 and the measurement range 125 of the surrounding environment recognition device 31 in a clear manner, and may display other regions in a blurry manner.

Returning back to FIG. 10, when it is not determined that there is a mobile body moving toward the region located ahead in the moving direction of the first vehicle 1a (S73/No), the display control processor 69 may determine whether a mobile body moving toward the region located ahead in the moving direction of the first vehicle 1a had been detected in the past calculation cycles (step S79). For example, the display control processor 69 may determine whether there is a mobile body that had been detected up to the previous calculation cycle but is no longer detected in the current calculation cycle.

When it is not determined that the mobile body had been detected in the past calculation cycles (S79/No), the display control processor 69 may cause the process to proceed to step S77 and cause the measurement range of the surrounding environment recognition device 31 of the first vehicle 1a and the measurement range of the on-road camera 150 to be superimposed and displayed on the map data (step S77). The display control processor 69 may convert the position data included in the measurement range and the measurement result of the on-road camera 150 acquired from the data processing device 110 and the position data included in the measurement range and the measurement result of the surrounding environment recognition device 31 of the first vehicle 1a into the data on the latitude and the longitude, and cause the converted pieces of data to be superimposed and displayed on the map data. This makes it possible for the driver to understand that the mobile body does not exist at least within the measurement range of the on-road camera 150, and that the presence or absence of the mobile body is unknown outside the measurement range of the on-road camera 150.

In contrast, when it is determined that a mobile body moving toward the region located ahead in the moving direction of the first vehicle 1a had been detected in the past calculation cycles (S79/Yes), the display control processor 69 may calculate a moving range in which the mobile body is estimated to exist (step S81). The display control processor 69 may calculate the moving direction and the moving distance of the mobile body from when the mobile body was last detected up to the current calculation cycle, based on the data on the moving direction and the moving speed of the mobile body included in the data on the measurement result of the on-road camera 150 acquired in the past calculation cycle. The display control processor 69 may estimate the position of the mobile body based on the calculated moving direction and the moving distance.

Thereafter, the display control processor 69 may cause the mobile body to be superimposed and displayed at the estimated position on the map data (step S83). Further, the display control processor 69 may cause the measurement range of the surrounding environment recognition device 31 of the first vehicle 1a and the measurement range of the on-road camera 150 to be superimposed and displayed on the map data (step S77). The display control processor 69 may convert the position data included in the measurement range and the measurement result of the on-road camera 150 acquired from the data processing device 110 and the position data included in the measurement range and the measurement result of the surrounding environment recognition device 31 of the first vehicle 1a into the data on the latitude and the longitude, and cause the converted pieces of data to be superimposed and displayed on the map data.

Further, in order to allow the driver to understand that the position of the mobile body that is displayed is an estimated moving range, and in consideration of a deviation between the estimated moving range and an actual position, the display control processor 69 may cause the position of the mobile body to be superimposed and displayed in a manner different from the case where the mobile body is actually detected. For example, the display control processor 69 may change the color of the mobile body, cause an outline of the mobile body to be ambiguously displayed, cause the outline to blink, or cause the outline to be enlarged.

In this case, the display control processor 69 may cause the display of the mobile body to be gradually changed. For example, the display control processor 69 may calculate the time to be used by the mobile body to reach the position where the mobile body enters the region located ahead in the moving direction of the first vehicle 1a from the position where the mobile body was last detected, based on the data on the position, the moving speed, and the moving direction of the mobile body when the mobile body was last detected. For example, the display control processor 69 may calculate the above-described time to be used by dividing a distance from a position where the mobile body was last detected to a position where the mobile body enters the region located ahead in the moving direction of the first vehicle 1a by the moving speed. The display control processor 69 may set the calculated time to be used to 100(%) and cause the displaying of the mobile body to be gradually changed in accordance with the percentage (%) of the elapsed time from when the mobile body became no longer detected.

For example, the display control processor 69 may cause the display of the mobile body to change from yellow to red, or may cause an outline that indicates the mobile body to change from a "thin line of dark color" to a "thick line of light color". As a result, even after the mobile body deviates from the measurement range 153 of the on-road camera 150, the estimated position of the mobile body is displayed while indicating uncertainty as time elapses from when the mobile body became no longer detected. This makes it possible for the driver who drives the first vehicle 1a to be made aware that the mobile body is approaching the region ahead of the first vehicle 1a.

FIG. 13 is an explanatory diagram illustrating a situation in which the first other vehicle 90 that has been detected is no longer detected in the calculation cycle subsequent to the state illustrated in FIG. 12. In the example illustrated in FIG. 13, the data indicating the first other vehicle 90 that is no longer detected may be gradually changed to be enlarged from the data indicating the first other vehicle 90 illustrated in FIG. 12, and the outline of the data indicating the first other vehicle 90 may be ambiguously displayed with a dotted line. This makes it possible for the driver to learn a position where there is a high possibility that the first other vehicle 90 exists although the first other vehicle 90 is no longer detected by the on-road camera 150. Accordingly, it is possible to make the driver to continue to pay attention to the first other vehicle 90. In one embodiment, the first other vehicle 90 may serve as a "mobile body".

Note that, in FIG. 13, while the display of the measurement range 153 of the on-road camera 150 having a fixed installation position is the same as the display of the measurement range 153 in FIG. 12, the display of the measurement range 125 of the surrounding environment recognition device 31 moving together with the first vehicle 1a may be changed from the display of the measurement range 125 in FIG. 12.

As described above, the display control processor 69 may execute the first display process of displaying the data on the measurement range and the data on the measurement result of the environment recognition device (the on-road camera 150) whose position does not move. In the first display process, the display control processor 69 may cause the measurement range of the on-road camera 150 whose position does not move to be superimposed and displayed on the map data and also cause the mobile body detected by the on-road camera 150 in the measurement range to be superimposed and displayed on the map data. Further, even when the mobile body that has been detected is no longer detected, the display control processor 69 may cause the moving range of the mobile body to be superimposed and displayed on the map data. Further, in the first display process, the display control processor 69 may cause the measurement range and the measurement result of the surrounding environment recognition device 31 of the first vehicle 1*a* to be superimposed and displayed on the map data.

Next, the second display process will be described. The second display process may be a process for a case where the measurement range of the environment recognition device in the real space changes.

FIG. 14 is a flowchart of the second display process performed by the display control processor 69.

The display control processor 69 may read the data on the measurement range and the data on the measurement result of the surrounding environment recognition device acquired from the other vehicle (the second vehicle 1*b*) and recorded in the storage 57 (step S91). Hereinafter, these pieces of data may also be referred to as a "measurement range of the second vehicle 1*b*" and a "measurement result obtained by the second vehicle 1*b*".

Thereafter, the display control processor 69 may determine whether there is a mobile body moving toward the region located ahead in the moving direction of the first vehicle 1*a*, based on the data on the measurement range and the measurement result of the second vehicle 1*b* and the data on the position and the moving direction of the first vehicle 1*a* (step S93). For example, the display control processor 69 may determine whether there is a mobile body moving toward the region located ahead in the moving direction of the first vehicle 1*a* in a procedure similar to the process in step S73 of the first display process.

When it is determined that there is a mobile body moving toward the region located ahead in the moving direction of the first vehicle 1*a* (S93/Yes), the display control processor 69 may cause the detected mobile body to be superimposed and displayed on the map data in accordance with the detected position in the real space (step S95). The display control processor 69 may convert the position data included in the measurement range and the measurement result of the surrounding environment recognition device acquired from the second vehicle 1*b* and the position data included in the measurement range and the measurement result of the surrounding environment recognition device 31 of the first vehicle 1*a* into the data on the latitude and the longitude, and cause the converted pieces of data to be superimposed and displayed on the map data.

Further, the display control processor 69 may cause the measurement range of the surrounding environment recognition device 31 of the first vehicle 1*a* and the measurement range of the surrounding environment recognition device of the second vehicle 1*b* to be superimposed and displayed on the map data (step S97). In this case, for example, the display control processor 69 may cause the measurement ranges of the surrounding environment recognition device of the second vehicle 1*b* from the past calculation cycle up to the current calculation cycle to be superimposed and displayed on the map data.

FIGS. 15 to 21 are diagrams that describe workings of the second display process. FIGS. 15 to 17 are diagrams that describe issues of the case where the technique of the disclosure is not applied. Note that FIGS. 15 to 17 do not represent what is displayed on the display 43.

As illustrated in FIG. 15, when the second vehicle 1*b* is traveling on the first road 141 prior to the first vehicle 1*a*, the blind spot regions 121*a* and 121*b* of the second road 143 may come into a measurement range 123*a* of the surrounding environment recognition device provided in the second vehicle 1*b* at a time t1 when the second vehicle 1*b* passes through the intersection of the first road 141 and the second road 143. This makes it possible for the driving assistance apparatus 50*a* of the first vehicle 1*a* that has acquired the data on the measurement result of the second vehicle 1*b* at the time t1 to recognize that the mobile body does not exist in the blind spot regions 121*a* and 121*b*.

In contrast, as illustrated in FIGS. 16 and 17, the blind spot regions 121*a* and 121*b* may be out of measurement ranges 123*b* and 123*c* at time t2 and time t3 after the time has elapsed, because the second vehicle 1*b* moves away from the intersection of the first road 141 and the second road 143. Thus, it is not possible for the driving assistance apparatus 50*a* of the first vehicle 1*a* that has acquired the data on the measurement result of the second vehicle 1*b* at the time t2 and the time t3 to recognize whether the mobile body exists in the blind spot regions 121*a* and 121*b*. Note that, in this case, there is a possibility that another mobile body enters the blind spot regions 121*a* and 121*b* after the time t1. Despite such possibility, when the driver who drives the first vehicle 1*a* is not notified of the presence of the mobile body in the blind spot regions 121*a* and 121*b* at the time t1, the driver may possibly pass through the intersection of the first road 141 and the second road 143 without paying attention to the blind spot regions 121*a* and 121*b*. Accordingly, there is a possibility of failing to avoid a contact if the mobile body appears from the blind spot regions 121*a* and 121*b* when the first vehicle 1*a* passes through the intersection.

FIGS. 18 to 21 are explanatory diagrams illustrating the second display process performed by the display control processor 69. FIGS. 18 to 21 illustrate an example in which the data on measurement ranges 125*a* to 125*c* of the surrounding environment recognition device 31 of the first vehicle 1*a* and the data on the measurement ranges 123*a* to 123*c* and a measurement range 123*d* of the surrounding environment recognition device of the second vehicle 1*b* are superimposed and displayed on the map data. FIGS. 18 to 20 respectively represent what is displayed at the times t1 to t3 illustrated in FIGS. 15 to 17. FIG. 21 represents what is displayed at time t4 after the time has further elapsed.

The display control processor 69 may cause the data indicating the mobile body that is identified based on the data on the measurement result of the second vehicle 1*b* and acquired from the second vehicle 1*b* to be superimposed and displayed at the detected position on the map data. Note that, however, in the example illustrated in FIGS. 18 to 21, no mobile body is displayed because the mobile body is not detected by the surrounding environment recognition device of the second vehicle 1*b*.

Further, as illustrated in FIG. 18, the display control processor 69 may cause the data indicating the measurement range 123*a* of the second vehicle 1*b* to be superimposed and displayed on the map data. The data indicating the measurement range 123*a* of the second vehicle 1*b* may be acquired from the driving assistance apparatus 50*b* of the second vehicle 1*b* passing through the intersection of the first road 141 and the second road 143 at the time t1. In the example illustrated in FIG. 18, the entire range of the map data may be displayed as a gray transparent display, and the measurement range 123*a* of the second vehicle 1*b* may be displayed in white. At the time t1, the driver who drives the first vehicle 1*a* may recognize that there is no mobile body in the blind spot regions 121*a* and 121*b* of the intersection that the first vehicle 1*a* is going to pass through later, based on the data on the measurement range 123*a* of the second vehicle 1*b* that is displayed and that there is no display of the mobile body.

As illustrated in FIGS. 19 to 21, the display control processor 69 may cause the pieces of data indicating the measurement ranges 123*b* to 123*d* of the second vehicle 1*b* acquired from the driving assistance apparatus 50*b* of the second vehicle 1*b* to be superimposed and displayed on the map data respectively at the times t2 to t4. In this case, the display control processor 69 may display the data indicating the most recent measurement ranges 123*b* to 123*d* acquired at each of the times t2 to t4 in white.

Additionally, at each of the times t2 to t4, the display control processor 69 may also display the data indicating the measurement ranges 123*a* to 123*c* acquired at past times. Hereinafter, the measurement ranges such as the measurement ranges 123*a* to 123*c* are collectively referred to as a measurement range 123. In this case, the display control processor 69 may change the display to sequentially shift from a white display to a gray display as the time elapses. For example, the display control processor 69 causes a display of a non-measurement range to be shifted to the display of the non-measurement range as the time elapses. The display of the non-measurement range is a display of a range that deviates from the measurement range 123 and is not being measured.

This makes it possible for the driver who drives the first vehicle 1*a* to recognize the data on the measurement result of the second vehicle 1*b* together with the changes in the measurement ranges 123*a* to 123*d* of the second vehicle 1*b*. Accordingly, it is possible for the driver of the first vehicle 1*a* to recognize not only the measurement result obtained by the second vehicle 1*b* at each of the times t1 to t4, but also the measurement result of the second vehicle 1*b* at the past times as well. Consequently, even after the second vehicle 1*b* has passed through the intersection, it is possible for the driver of the first vehicle 1*a* to determine the avoidance behavior assuming that there is a low possibility that the other vehicle enters the intersection.

The display control processor 69 may determine a set time up to when the measurement range in the past is returned to the same display as the region outside the measurement range (the gray display in the above-described example), based on a recognition performance of the surrounding environment recognition device provided on the second vehicle 1*b*. For example, the number of the measurement ranges of the past calculation cycles to be displayed may be determined based on the recognition performance of the surrounding environment recognition device.

For example, in the example illustrated in FIGS. 18 to 21, assume that a lateral measurement range of the second vehicle 1*b* is 50 m, and a speed limit of the second road 143 is 30 km/h. The display control processor 69 may assume that the other vehicle will enter the intersection from the second road 143 at 40 km/h and may set the above-described set time to 4 seconds (rounding off the decimal point of 50 m÷40 km/h×3.6=4.5). Accordingly, when the first vehicle 1*a* enters the intersection within 4 seconds before the other vehicle enters the intersection, it is possible for the driver of the first vehicle 1*a* to avoid performing an unnecessary avoidance behavior (such as complete stop), based on data on the past measurement result.

Note that, in the example illustrated in FIGS. 18 to 21 also, in terms of specifications, even in a region that is within the measurement range 125 of the first vehicle 1*a* and the measurement range 123 of the surrounding environment recognition device of the second vehicle 1*b*, a region where, for example, a vehicle or a pedestrian is unable to pass through is indicated as the gray transparent display. Additionally, the data on the mobile body to be superimposed and displayed on the map data may be any of a figure, a character, and an icon as long as it is data that allows the driver to distinguish the type of the mobile body. Alternatively, the data on the mobile body to be superimposed and displayed on the map data may be an image of the mobile body captured by the second vehicle 1*b*.

Returning back to FIG. 14, when it is not determined that there is a mobile body moving toward the region located ahead in the moving direction of the first vehicle 1*a* (S93/ No), the display control processor 69 may determine whether a mobile body had been detected in the past calculation cycles (step S99). For example, the display control processor 69 may determine whether there is a mobile body that had been detected up to the previous calculation cycle but is no longer detected in the current calculation cycle.

When it is not determined that the mobile body had been detected in the past calculation cycles (S99/No), the display control processor 69 may cause the process to proceed to step S97 and cause the measurement range 125 of the surrounding environment recognition device 31 of the first vehicle 1*a* and the measurement range 123 of the surrounding environment recognition device of the second vehicle 1*b* to be superimposed and displayed on the map data (step S97). The display control processor 69 may convert the position data included in the measurement range and the measurement result of the surrounding environment recognition device acquired from the second vehicle 1*b* and the position data included in the measurement range and the measurement result of the surrounding environment recognition device 31 of the first vehicle 1*a* into the data on the latitude and the longitude, and cause the converted pieces of data to be superimposed and displayed on the map data.

Additionally, for example, the display control processor 69 may cause the measurement ranges of the surrounding environment recognition device of the second vehicle 1*b* from the past calculation cycle up to the current calculation cycle to be superimposed and displayed on the map data. This makes it possible for the driver to understand that the mobile body does not exist at least within the measurement range 123 of the second vehicle 1*b*, and that the presence or absence of the mobile body is unknown outside the measurement range 123 of the second vehicle 1*b*.

In contrast, when it is determined that the mobile body had been detected in the past calculation cycles (S99/Yes), the display control processor 69 may calculate the moving range in which the mobile body is estimated to exist (step S101). The display control processor 69 may calculate the moving direction and the moving distance of the mobile body from when the mobile body was last detected up to the current calculation cycle, based on the data on the moving direction and the moving speed of the mobile body included in the data on the measurement result of the second vehicle 1*b* acquired in the past calculation cycles. The display control processor 69 may estimate the moving range of the mobile body based on the calculated moving direction and the moving distance.

Thereafter, the display control processor 69 may cause the moving range of the mobile body to be superimposed and displayed on the map data (step S103). Further, the display control processor 69 may cause the measurement range 125 of the surrounding environment recognition device 31 of the first vehicle 1*a* and the measurement range 123 of the second vehicle 1*b* to be superimposed and displayed on the map data (step S97). The display control processor 69 may convert the position data included in the measurement range and the measurement result of the surrounding environment recognition device acquired from the second vehicle 1*b* and the position data included in the measurement range and the measurement result of the surrounding environment recognition device 31 of the first vehicle 1*a* into the data on the latitude and the longitude, and cause the converted pieces of data to be superimposed and displayed on the map data.

In this case, for example, the display control processor 69 may cause the measurement ranges of the surrounding environment recognition device of the second vehicle 1*b* from the past calculation cycle up to the current calculation cycle to be superimposed and displayed on the map data. Further, in order to allow the driver to understand that the position of the mobile body that is displayed is an estimated moving range, and in consideration of a deviation between the estimated moving range and an actual position, the display control processor 69 may cause the position of the mobile body to be superimposed and displayed in a manner different from the case where the mobile body is actually detected. For example, the display control processor 69 may change the color of the mobile body, cause an outline of the mobile body to be ambiguously displayed, cause the outline to blink, or cause the outline to be enlarged. In this case, the display control processor 69 may gradually change the display of the mobile body in a manner similar to that of the first display process.

FIGS. 22 to 25 illustrate exemplary displays when a pedestrian 127 is detected by the second vehicle 1*b* at the time t1 (FIG. 22) in the situation illustrated in FIGS. 18 to 21, but the pedestrian 127 is no longer detected at the subsequent times t2 to t4 (FIGS. 23 to 25).

In the examples illustrated in FIGS. 23 to 25, the data indicating the pedestrian 127 who is no longer detected is enlarged from the data indicating the pedestrian 127 illustrated in FIG. 22, and the outline is displayed ambiguously with a dotted line. Further, because the moving range of the pedestrian 127 widens as the time elapses, the size of the data indicating the pedestrian 127 that is displayed may be gradually changed to be enlarged as the time elapses. This makes it possible for the driver of the first vehicle 1*a* to learn a position where there is a high possibility that the pedestrian 127 exists although the pedestrian 127 is no longer detected by the second vehicle 1*b*. Accordingly, it is possible to make the driver to continue to pay attention also to the pedestrian 127. In one embodiment, the pedestrian 127 may serve as a "mobile body".

As described above, the display control processor 69 may execute the second display process of displaying the data on the measurement range and the data on the measurement result of the environment recognition device whose position moves (the surrounding environment recognition device of the second vehicle 1*b*). In the second display process, the display control processor 69 may cause the measurement range 123 of the second vehicle 1*b* to be superimposed and displayed on the map data and cause the mobile body detected by the surrounding environment recognition device of the second vehicle 1*b* in the measurement range 123 to be superimposed and displayed on the map data. Further, the display control processor 69 may also cause the measurement ranges of the second vehicle 1*b* acquired in the past calculation cycles to be superimposed and displayed on the map-data. Further, even when the mobile body that has been detected is no longer detected, the display control processor 69 may cause the moving range of the mobile body to be superimposed and displayed on the map data. Further, in the second display process, the display control processor 69 may cause the measurement range and the measurement result of the surrounding environment recognition device 31 of the first vehicle 1*a* to be superimposed and displayed on the map data.

Returning back to FIG. 8, in step S47, after the display control processor 69 executes one or both of the first display process and the second display process, the processor 55 may determine whether the activation of the assistance operation by the driving assistance apparatus 50*a* has been stopped (step S49). When it is not determined that the activation of the assistance operation has been stopped (S49/No), the processor 55 may return to step S33 and repeat the processes of the steps described so far. In contrast, when it is determined that the activation of the assistance operation has been stopped (S49/Yes), the processor 55 may end the series of processes.

As described above, the driving assistance apparatus 50*a* according to the example embodiment acquires the data on the measurement ranges 123 and 153 and the data on the measurement result from the environment recognition device provided at a location other than the first vehicle 1*a* to be assisted (e.g., the on-road camera 150 and the surrounding environment recognition device of the second vehicle 1*b*). Further, the driving assistance apparatus 50*a* causes the data on the measurement ranges 123 and 153 and the data on the detected mobile body that are visually recognizable by the driver of the first vehicle 1*a* to be displayed in a superimposed manner on the map data.

This makes it possible for the driver of the first vehicle 1*a* to be assisted to recognize not only the presence or absence of the mobile body detected by the environment recognition device other than that of the first vehicle 1*a* but also the measurement range of the environment recognition device. Accordingly, it is possible to improve reliability felt by the driver for the data on the presence or absence of the mobile body displayed by the driving assistance apparatus 50*a*. Consequently, it is possible to guide the driver of the first vehicle 1*a* to perform the avoidance behavior expected by the driving assistance executed by the driving assistance apparatus 50*a*.

Further, the driving assistance apparatus 50*a* according to the example embodiment causes the data on the measurement range 125 of the surrounding environment recognition device 31 provided on the first vehicle 1*a* to be assisted and the data on the detected mobile body to be superimposed and displayed on the map data. This makes it possible for the driver of the first vehicle 1*a* to be assisted to recognize the measurement range and the measurement result of the surrounding environment recognition device 31 of the first vehicle 1*a*. Accordingly, it is possible to guide the driver of the first vehicle 1*a* to perform the avoidance behavior expected by the driving assistance executed by the driving assistance apparatus 50*a*.

Further, the driving assistance apparatus 50*a* according to the example embodiment causes the display of the non-measurement range to be shifted to the display of the non-measurement range as the time elapses when the measurement range of the environment recognition device other than that of the first vehicle 1*a* in the real space changes. The display of the non-measurement range is a display of a range that deviates from the measurement range and is not being measured. This makes it possible for the driver of the first vehicle 1*a* to recognize the measurement result by the second vehicle 1*b* at the past times as well and to determine the avoidance behavior taking into consideration the presence or absence of the mobile body in the past in the region that has deviated from the measurement range.

In some embodiments, the driving assistance apparatus 50a may cause the displaying of the mobile body to be continued even after the mobile body that has been detected by the environment recognition device other than that of the first vehicle 1a becomes no longer detected. This makes it possible to cause the driver of the first vehicle 1a to continue paying attention to the mobile body even when the mobile body that is not recognized by the first vehicle 1a is no longer measured by the environment recognition device other than that of the first vehicle 1a.

In some embodiments, when the mobile body detected by the environment recognition device other than that of the first vehicle 1a is moving toward the region located ahead in the moving direction of the first vehicle 1a, the driving assistance apparatus 50a may cause the displaying of the mobile body to be gradually changed after the mobile body becomes no longer detected. This makes it possible for the driver of the first vehicle 1a to learn a position where there is a high possibility that the mobile body exists and determine an appropriate avoidance behavior even when the mobile body that is not recognized by the first vehicle 1a is no longer measured by the environment recognition device other than that of the first vehicle 1a.

In some embodiments, the driving assistance apparatus 50a may estimate the moving range of the mobile body after the mobile body becomes no longer detected by the environment recognition device other than that of the first vehicle 1a, based on the position and the moving speed of the mobile body that has been detected, and cause an existing range in which the mobile body is assumed to exist to be displayed. This makes it possible to cause the driver of the first vehicle 1a to determine an avoidance behavior assuming a range where the mobile body may exist.

Note that, in the above-described example embodiments, an example has been described in which the display control processor 69 executes the first display process when the measurement range of the on-road camera 150 is not changed. However, for example, when the imaging direction of the on-road camera 150 changes, causing the measurement range of the on-road camera 150 to change, the display control processor 69 may execute the second display process using the data on the measurement range and the data on the measurement result of the on-road camera 150. This makes it possible to cause the driver of the first vehicle 1a to determine an appropriate driving behavior, based on the data on the measurement range and the measurement result at each time even when the measurement range of the on-road camera 150 changes.

5. Other Example Embodiments

Although the driving assistance apparatus according to the example embodiments of the disclosure has been described in the forgoing, various modification examples may be made to the example embodiments described above. Some of the modification examples are described below.

5-1. First Modification Example

In some embodiments, when the mobile body that had been detected by the environment recognition device other than that of the first vehicle 1a was stopped or moving in a direction away from the region located ahead in the moving direction of the first vehicle 1a immediately before the mobile body becomes no longer detected, the display control processor 69 of the driving assistance apparatus 50a may cause the displaying of the mobile body to be continued at a position immediately before the mobile body becomes no longer detected by the environment recognition device.

FIG. 26 is a flowchart applied to the display process performed by the display control processor of the driving assistance apparatus according to a first modification example. The flowchart illustrated in FIG. 26 may be executed when the determination result in step S79 of the first display process illustrated in FIG. 10 is "No" and when the determination result in step S99 of the second display process illustrated in FIG. 14 is "No".

When the determination result in step S79 or step S99 is "No" (S79/No or S99/No), the display control processor 69 may determine whether there was a mobile body that was stopped or moving away from the region located ahead in the moving direction of the first vehicle 1a in the past calculation cycles (step S111).

When the determination result in step S111 is "No" (S111/No), the display control processor 69 may cause the process to proceed to step S77 in FIG. 10 or step S97 in FIG. 14 and display the measurement range of the surrounding environment recognition device 31 of the first vehicle 1a and the measurement range of the environment recognition device other than that of the first vehicle 1a. In contrast, when the determination result is "Yes" in step S111 (S111/Yes), the display control processor 69 may continue displaying the mobile body on the map data at a position where the mobile body was detected immediately before the mobile body that was stopped or moving away as described above became no longer detected (step S113). Thereafter, the display control processor 69 may cause the process to proceed to step S77 in FIG. 10 or step S97 in FIG. 14 and display the measurement range of the surrounding environment recognition device 31 of the first vehicle 1a and the measurement range of the environment recognition device other than that of the first vehicle 1a.

In the display process according to the first modification example, the display control processor 69 may maintain displaying the mobile body at the position where the mobile body was last detected even when the mobile body that was stopped or moving in the direction away from the region located ahead in the moving direction of the first vehicle 1a became no longer detected. This makes it possible for the driver of the first vehicle 1a to recognize the position where the mobile body that was unlikely to contact the first vehicle 1a was present in the past, and determine the avoidance behavior while taking into consideration a possibility that the mobile body moves after deviating from the measurement range of the environment recognition device other than that of the first vehicle 1a.

5-2. Second Modification Example

In the above-described example embodiments, the display control processor 69 may superimpose and display the data that is visually recognizable by the driver on the map data. In some embodiments, the data that is visually recognizable by the driver may be superimposed and displayed on the real space. In a second modification example, for example, the vehicle 1 may include, as the display 43, a head-up display that displays data on a front windshield.

The surrounding environment recognition processor 67 may acquire data on positions of eyes and a direction of a line of sight of the driver in the real space, which are detected based on image data transmitted from a camera that captures an image of an inside of the vehicle. The surrounding environment recognition processor 67 may calculate a blind spot region viewed from the driver, based on the data on the positions of the eyes and the direction of the line of sight of the driver in the real space and the data on the measurement result obtained by the surrounding environment recognition device 31. For example, the surrounding environment recognition processor 67 may set a region on a back side of a three-dimensional object as viewed from the driver detected by the surrounding environment recognition device 31 as a blind spot region. The positions of the eyes and the direction of the line of sight of the driver may be detectable, for example, by the pattern matching process. The method of calculating the blind spot region is not limited to a particular method.

Further, the display control processor 69 may acquire the data on the positions of the eyes and the direction of the line of sight of the driver in the real space, and identify scenery that is viewable from the driver through the front windshield, based on the data on the positions of the eyes and the direction of the line of sight of the driver and the data on the measurement result obtained by the surrounding environment recognition device 31. Additionally, the display control processor 69 may drive the display 43, based on the data on the scenery that is viewable from the driver through the front windshield, the data on the blind spot region, and the data on the measurement range and the data on the measurement result of the environment recognition device other than that of the first vehicle 1a. The display control processor 69 may cause the data on the measurement range and the data on the measurement result of the environment recognition device other than that of the first vehicle 1a to be superimposed and displayed on the real space.

FIGS. 27 to 29 are explanatory diagrams illustrating the display process according to the second modification example. FIGS. 27 to 29 illustrate, in time series (times t11 to t13), a situation in which a preceding vehicle 171 that is configured to perform vehicle-to-vehicle communication with the first vehicle 1a travels in front of the first vehicle 1a.

At each of the times t11 to t13, the display control processor 69 may identify the scenery that is viewable from the driver through a front windshield 177, based on the data on the measurement result obtained by the surrounding environment recognition device 31 of the first vehicle 1a and the data on the positions of the eyes and the direction of the line of sight of the driver. Further, the display control processor 69 may acquire the data on the blind spot region as viewed from the driver and calculate measurement ranges 173a to 173c and a detected mobile body (a pedestrian in the illustrated example) 175a to 175c in the blind spot region, based on the data on the measurement range and the data on the measurement result of the surrounding environment recognition device acquired from the preceding vehicle 171.

The display control processor 69 may drive the display 43 to cause the data on the measurement ranges 173a to 173c and the data on the mobile body 175a to 175c that are visually recognizable by the driver to be superimposed and displayed on the real space. A method of driving the display 43 to cause predetermined data to be superimposed and displayed on the real space may be any known technique, and thus a detailed description thereof will be omitted.

In the illustrated example, the display control processor 69 may cause the measurement ranges 173a to 173c of the preceding vehicle 171 from the past calculation cycle up to the current calculation cycle to be superimposed and displayed on the real space. For example, the display control processor 69 may provide a transparent display in different colors so that the driver who is looking forward easily recognizes the display even in a peripheral vision. This makes it easier for the driver to grasp the changes in the measurement range even in the peripheral vision, and it is possible to provide the data without excessively consuming an attention resource from a safety check such as paying close attention to the front.

Further, in the illustrated example, even when the mobile body 175a to 175c that has been detected deviates from the measurement range of the preceding vehicle 171, the display control processor 69 may set a time to be used by the mobile body 175a to 175c to reach a position where the mobile body 175a to 175c enters the region located ahead in the moving direction of the first vehicle 1a from a position where the mobile body 175a to 175c was last detected as 100(%). The display control processor 69 may gradually change the display of the mobile body 175a to 175c in accordance with the percentage (%) of the elapsed time from when the mobile body 175a to 175c became no longer detected. As a result, even after the mobile body 175a to 175c deviates from the measurement ranges 173a to 173c of the preceding vehicle 171, the estimated position of the mobile body 175a to 175c may be displayed while indicating uncertainty as the time elapses from when the mobile body 175a to 175c became no longer detected. This makes it possible to cause the driver of the first vehicle 1a to be aware that the mobile body 175a to 175c is approaching the region ahead of the first vehicle 1a. In one embodiment, the mobile body 175a to 175c may serve as a "mobile body".

Note that, in the second modification example, the predetermined data may be superimposed and displayed on the real space. However, the predetermined data may be superimposed on a captured image obtained by imaging the real space and displayed on, for example, a display panel or the front windshield 177. In one embodiment, the front windshield 177 may serve as an "image display".

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above-described example embodiments, the driving assistance apparatus may provide the driver with the predetermined data using the display and cause the driver to determine an appropriate driving behavior. However, the technique of the disclosure is not limited to the above-described example. In some embodiments, the driving assistance apparatus may give a warning, or perform driving assistance or automated driving by a vehicle control, based on the data on the measurement range and the data on the measurement result of the environment recognition device other than that of the vehicle to be assisted.

In some embodiments, some of the components of the data processing device and the driving assistance apparatus described in the above example embodiments may be provided in other devices.

Further, in the above-described example embodiments, the environment recognition device (such as the on-road camera) may transmit data to the driving assistance apparatus through the data processing device. However, the technique of the disclosure is not limited to such an example. In some embodiments, the environment recognition device (such as the on-road camera) may be configured to directly transmit data to the driving assistance apparatus through a road-to-vehicle communication system. Such a configuration also makes it possible to achieve example effects similar to those of the above example embodiments.

Further, in the above-described example embodiments, the driving assistance apparatus may include an electronic control unit mounted on the vehicle, but the technique of the disclosure is not limited to the above-described example. In some embodiments, the driving assistance apparatus may include a portable terminal configured to communicate with an environment recognition device other than that of the vehicle and transmit a driving command signal to the display.

Further, it is possible for the technique of the disclosure to be implemented as a vehicle equipped with the driving assistance apparatus described in at least one of the above example embodiments, a driving assistance method performed by the driving assistance apparatus, a computer program that causes a computer to operate as the driving assistance apparatus, and a non-transitory tangible recording medium containing the computer program.

In at least one embodiment, it is possible to cause the driver to perform an appropriate driving behavior by displaying data on the surrounding environment acquired by the vehicle to be assisted from the environment recognition device outside the vehicle, together with the measurement range of the environment recognition device.

As used herein, the term "collision" may be used interchangeably with the term "contact".

The driving assistance apparatus 50 illustrated in FIG. 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assistance apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving assistance apparatus 50 illustrated in FIG. 7.

The invention claimed is:

1. A driving assistance apparatus configured to assist driving of a vehicle by a driver who drives the vehicle, the driving assistance apparatus comprising:

one or more processors; and one or more memories communicably coupled to the one or more processors, wherein the one or more processors are configured to:

acquire, from at least one environment recognition device provided at a location other than the vehicle, data on a measurement range of the environment recognition device and data on a measurement result obtained by the environment recognition device;

cause the data on the measurement range and the data on the measurement result that are visually recognizable by the driver of the vehicle to be displayed on an image display in a superimposed manner on map data, a real space, or a captured image of the real space; and when the measurement range of the environment recognition device in the real space changes as time elapses, (i) cause, for a region that has moved out of the measurement range and is no longer measured, the region to be displayed on the image display as a non-measurement range, and (ii) cause a display mode of the non-measurement range on the image display to be changed according to how long the region has been outside the measurement range.

2. The driving assistance apparatus according to claim 1, wherein the one or more processors are configured to cause a mobile body detected by the environment recognition device to be displayed in the superimposed manner, and cause the displaying of the mobile body to be continued even after the mobile body becomes no longer detected by the environment recognition device.

3. The driving assistance apparatus according to claim 2, wherein the one or more processors are configured to, when the mobile body is moving toward a region ahead in a moving direction of the vehicle, cause a display mode of the mobile body to be gradually changed after the mobile body becomes no longer detected by the environment recognition device.

4. The driving assistance apparatus according to claim 3, wherein the one or more processors are configured to estimate a moving range of the mobile body after the mobile body becomes no longer detected by the environment recognition device, based on a position and a moving speed of the mobile body, and cause an existing range in which the mobile body is assumed to exist to be displayed.

5. The driving assistance apparatus according to claim 2, wherein the one or more processors are configured to, when the mobile body has been stopped or moving in a direction away from a region ahead in a moving direction of the vehicle, cause the displaying of the mobile body to be continued at a position detected before the mobile body becomes no longer detected by the environment recognition device.

6. The driving assistance apparatus according to claim 1, wherein the one or more processors are configured to cause a measurement range of a surrounding environment recognition device mounted on the vehicle to be displayed on the image display in the superimposed manner on the map data, the real space, or the captured image of the real space.

7. A driving assistance method that assists driving of a vehicle by a driver who drives the vehicle, the method comprising:

acquiring, from at least one environment recognition device provided at a location other than the vehicle, data on a measurement range of the environment recognition device and data on a measurement result obtained by the environment recognition device;

causing the data on the measurement range and the data on the measurement result that are visually recognizable by the driver of the vehicle to be displayed on an image display in a superimposed manner on map data, a real space, or a captured image of the real space; and when the measurement range of the environment recognition device in the real space changes as time elapses, (i) causing, for a region that has moved out of the measurement range and is no longer measured, the region to be displayed on the image display as a non-measurement range, and (ii) causing a display mode of the non-measurement range on the image display to be changed according to how long the region has been outside the measurement range.

8. A non-transitory tangible computer readable recording medium containing a program, the program causing, when executed by a computer, the computer to implement a method, the method comprising:

acquiring, from at least one environment recognition device provided at a location other than a vehicle, data on a measurement range of the environment recognition device and data on a measurement result obtained by the environment recognition device;

causing the data on the measurement range and the data on the measurement result that are visually recognizable by a driver who drives the vehicle to be displayed on an image display in a superimposed manner on map data, a real space, or a captured image of the real space; and when the measurement range of the environment recognition device in the real space changes as time elapses, (i) causing, for a region that has moved out of the measurement range and is no longer measured, the region to be displayed on the image display as a non-measurement range, and (ii) causing a display mode of the non-measurement range on the image display to be changed according to how long the region has been outside the measurement range.

9. A driving assistance apparatus configured to assist driving of a vehicle by a driver who drives the vehicle, the driving assistance apparatus comprising:

one or more processors; and one or more memories communicably coupled to the one or more processors, wherein the one or more processors are configured to acquire, from at least one environment recognition device provided at a location other than the vehicle, data on a measurement range of the environment recognition device and data on a measurement result obtained by the environment recognition device, cause the data on the measurement range and the data on the measurement result that are visually recognizable by the driver of the vehicle to be displayed on an image display in a superimposed manner on map data, a real space, or a captured image of the real space, and cause a display of a non-measurement range to be shifted to the display of the non-measurement range as time elapses when the measurement range of the environment recognition device in the real space changes, the display of the non-measurement range being a display of a range that deviates from the measurement range and is not being measured, wherein the one or more processors are configured to cause a mobile body detected by the environment recognition device to be displayed in the superimposed manner, and cause the displaying of the mobile body to be continued even after the mobile body becomes no longer detected by the environment recognition device.

10. The driving assistance apparatus according to claim 9, wherein the one or more processors are configured to, when the mobile body is moving toward a region ahead in a moving direction of the vehicle, cause the displaying of the mobile body to be gradually changed after the mobile body becomes no longer detected by the environment recognition device.

11. The driving assistance apparatus according to claim 10, wherein the one or more processors are configured to estimate a moving range of the mobile body after the mobile body becomes no longer detected by the environment recognition device, based on a position and a moving speed of the mobile body, and cause an existing range in which the mobile body is assumed to exist to be displayed.

12. The driving assistance apparatus according to claim 9, wherein the one or more processors are configured to, when the mobile body has been stopped or moving in a direction away from a region ahead in a moving direction of the vehicle, cause the displaying of the mobile body to be continued at a position detected before the mobile body becomes no longer detected by the environment recognition device.

* * * * *